(12) United States Patent
Murakami

(10) Patent No.: US 6,690,490 B1
(45) Date of Patent: Feb. 10, 2004

(54) IMAGE PROCESSOR

(75) Inventor: Yoshinori Murakami, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/549,826

(22) Filed: Apr. 14, 2000

(30) Foreign Application Priority Data

Apr. 16, 1999 (JP) .............................. 11-110010

(51) Int. Cl.$^7$ ................... H04N 1/405; H04N 1/407; H04N 1/52; H04N 1/60
(52) U.S. Cl. .................. 358/1.9; 358/3.06; 358/504; 358/521; 358/525; 358/534; 358/406
(58) Field of Search ................ 358/1.9, 3.01, 358/3.06, 3.21, 518, 521, 534, 535, 536, 406, 504, 525

(56) References Cited

U.S. PATENT DOCUMENTS 5,696,889 A  * 12/1997 Morikawa .................. 358/1.9

FOREIGN PATENT DOCUMENTS

| JP | 4-180354 | | 6/1992 | ............ H04N/1/40 |
| JP | 08214164 A | * | 8/1996 | .......... H04N/1/407 |

* cited by examiner

*Primary Examiner*—Scott Rogers
(74) *Attorney, Agent, or Firm*—David G. Conlin; David A. Tucker; Edwards & Angell, LLP

(57) ABSTRACT

There is provided an image processor for obtaining a correction curve used in a gradation correcting process smoothly and quickly. In the image processor, a curve storing section stores reference correction curves and a correction amount storing section stores correction amounts corresponding to a plurality of specified input density values. A halftone output gradation processing section calculates the correction value to the specified input density value by using the reference correction curve and the set of correction amounts in copying original and calculates a correction value to the remaining input density value by means of interpolation operation for moving one part of the reference correction curve in the direction parallel to the axis of density value and for expanding or compressing in that direction.

23 Claims, 20 Drawing Sheets

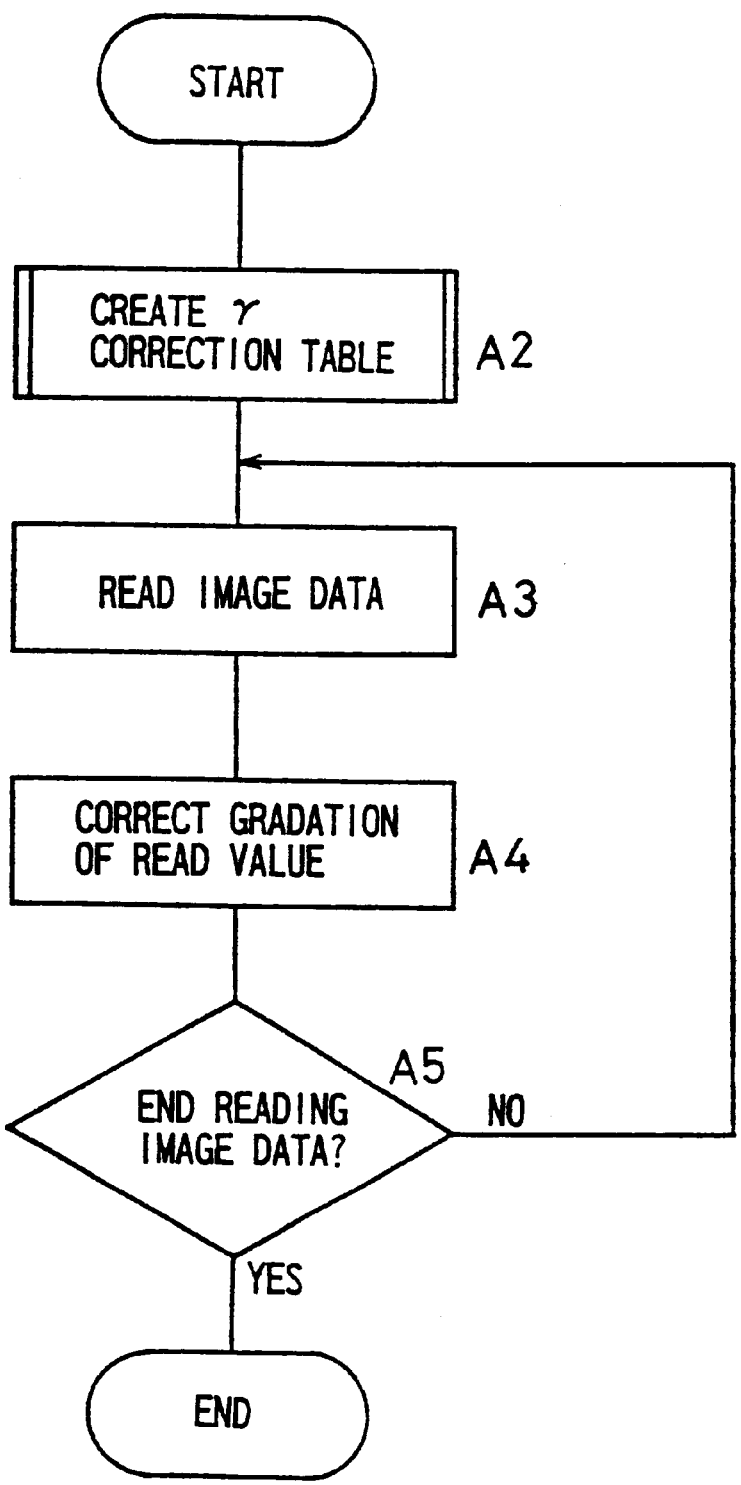
F I G. 12

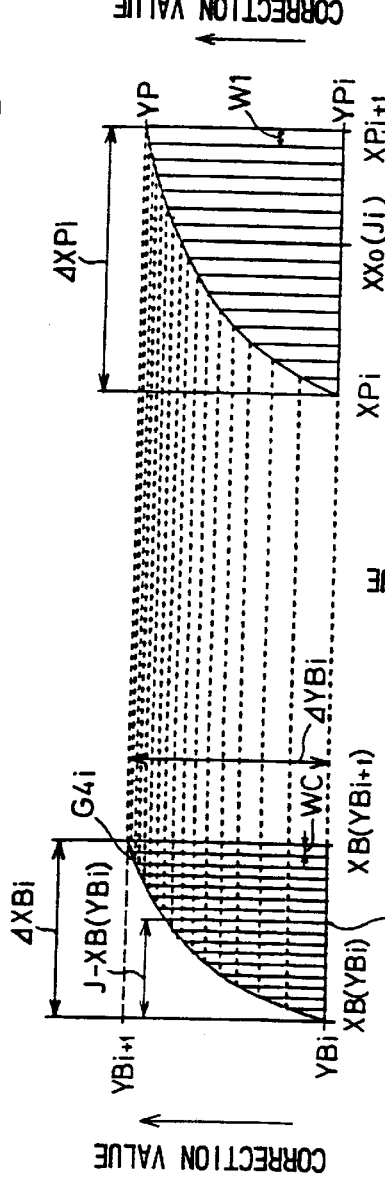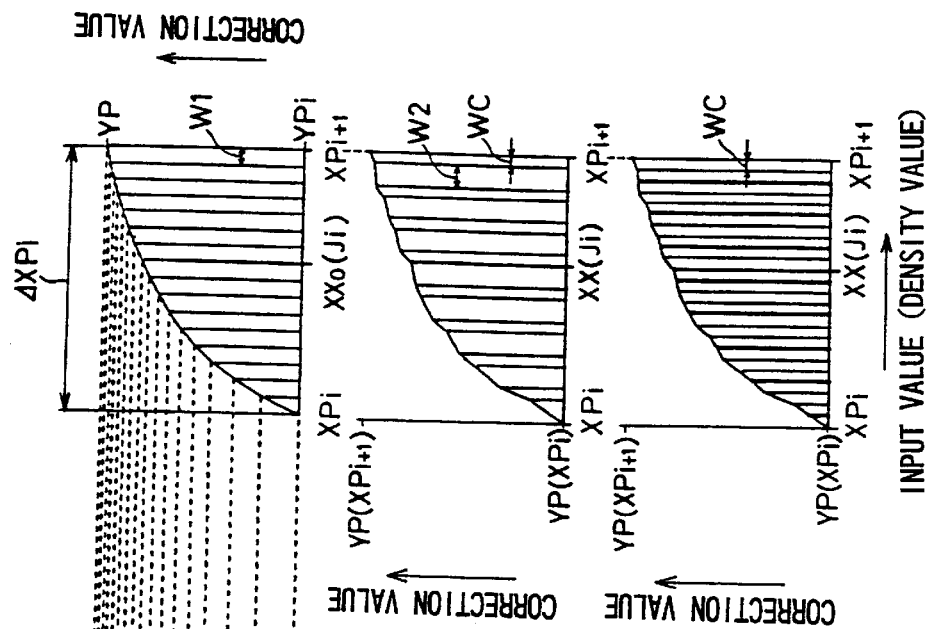

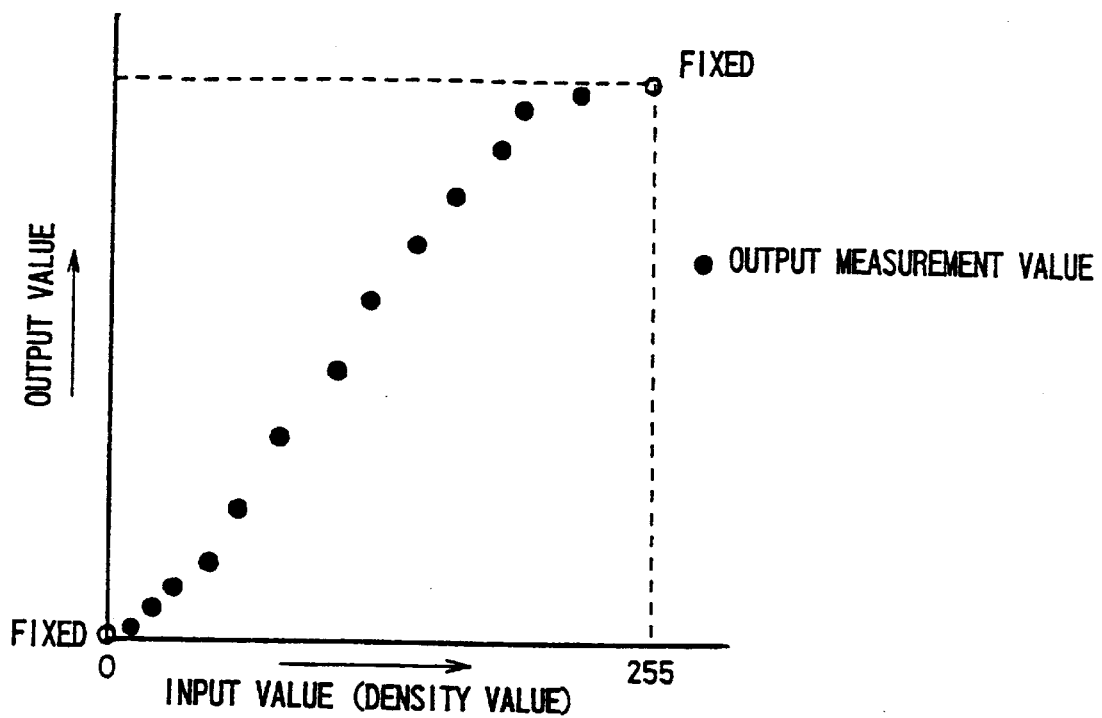
F I G. 16

IMAGE PROCESSOR

BACKGROUND OF THE INVENTION

1. Field of the Invention

The present invention relates to an image processor for use in digital color image forming apparatuses such as a digital color copier and more specifically to a gradation correcting process.

2. Description of Prior Art

There is disclosed a prior art related to a gradation correction process in Japanese Unexamined Patent Publication JP-A 4-180354 (1992). A digital copier provided with a density correcting unit of JP-A 4-180354 comprises an electrophotographic printer. In the printer, a photosensitive film is exposed to a modulated light beam which is controlled by an optically modulated signal. The density correcting unit carries out a gradation correcting process while converting an image signal of an object to be processed into the optically modulated signal. To that end, the density correcting unit stores preset desired characteristics of the digital copier and a preset reference conversion table. The desired characteristic indicates changes of density of recording density to a density value of an image signal. The reference conversion table is a reference correction curve indicative of predetermined changes of a value of the optically modulated signal with respect to the density value within the image signal.

The density correcting unit carries out the following procedure to create a signal conversion table which is a correction curve actually used in processing the image signal. The density correcting unit generates a plurality of reference image signals whose density values are different from each other, converts the respective reference image signals into the optically modulated signals, respectively, based on the reference conversion table and supplies them to the printer. The printer prints a recorded image corresponding to the respective reference image signals by modulating the light beams based on the respective optically modulated signals, by exposing the photosensitive film by using the light beam and by developing the photosensitive film after the exposure. The density correcting unit measures the density of the respective printed recorded images and finds a density value of the desired characteristics to each density.

Next, the density correcting unit calculates a deviation between a value of the optically modulated signal on the reference conversion table to the density value of the desired characteristics to the density of the respective recorded images and a value of the optically modulated signal on the reference conversion table to the density value of the reference image signal corresponding to the respective recorded images. Then, the density correcting unit carries out an interpolation process using the deviation of the density values of the reference image signal to obtain a deviation of a density value other than the density value of the reference image signal to set the deviation of the density value as continuous data. The interpolation process is a publicly known interpolation and is realized by a combination of spline interpolation, linear interpolation and smoothing or by n-order function approximation.

Finally, the density correcting unit corrects the reference conversion table to obtain a value on the signal conversion table. A value of an optically modulated signal on the reference correction curve to the density value of the reference image signal corresponding to the respective recorded images is substituted into the correction value on the signal conversion table with respect to the density value on the desired characteristics to the density of the respective recorded images. A correction value on the signal conversion table with respect to a density value other than the density value on the desired characteristics to the density of the respective recorded images may be obtained by correcting the reference conversion table based on the data of the continuous deviation. The signal conversion table obtained as the result of the above-mentioned process is actually used in the density correcting unit.

The density correcting unit in the above-mentioned JP-A 4-180354 carries out the interpolation in order to obtain the data of deviation of the continuous density values as described above. The interpolation is realized by the combination of spline interpolation, linear interpolation and smoothing or by the n-order function approximation. When these known interpolations are used, no reference is made to the reference conversion table in the interpolation of the deviation. Thus, the output characteristics of the signal conversion table is liable to lack the reliability.

SUMMARY OF THE INVENTION

It is an object of the invention to provide an image processor capable of improving the reliability of the output characteristics of the correction curve actually used in the gradation correcting process.

In a first aspect of the invention, an image processor comprises image inputting means for inputting an image, gradation correction processing means for performing a gradation correcting process using a correction curve to the inputted image and image outputting means for outputting the image for which the gradation correcting process has been performed, the image inputting means supplying input density values of pixels composing the image, to the gradation correction processing means, the gradation correction processing means supplying correction values on the correction curve to the input density values, to the image outputting means, the image processor further comprising:

reference correction curve storing means for storing a reference correction curve indicative of predetermined changes of the correction values to the input density values; and correction amount storing means for storing correction amounts $w_i$ and $w_{i+1}$ which are preset based on the reference correction curve and correspond to a plurality of specified density values $XP_i$ and $XP_{i+1}$, respectively, which are input density values specified at intervals from each other within the range of the input density values, wherein the correction amount $w_i$ corresponding to the specified density value $XP_i$ is a difference between a correction value $YB(XP_i)$ on the reference correction curve to the specified density value $XP_i$ and a correction value $YP(XP_i)$ to the specified density value on the correction curve, the gradation correction processing means, in order to create the correction curve to be used for the gradation correcting process, (a) calculates the correction values $YP(XP_i)$ and $YP(XP_{i+1})$ to the specified density values $XP_i$ and $XP_{i+1}$ on the correction curve, by adding the correction values to the specified density values $XP_i$ and $XP_{i+1}$ on the reference correction curve and the correction amounts $w_i$ and $w_{i+1}$ corresponding to the specified density values $XP_i$ and $XP_{i+1}$, and (b) calculates the correction value to the input density value other than the specified density value by means of interpolation operation for causing a shape of a part of the correction curve within a first section $\Delta XP_i$ having the specified density values $XP_i$ and $XP_{i+1}$ as both ends thereof, to coincide with a shape obtained by expanding or compressing in the direction X parallel to the axis of density value, a part of the reference correction curve within a second section $\Delta YB_i$ having the correction values $YP(XP_i)$ and $YP(XP_{i+1})$ to the specified density values as both ends thereof.

According to the first aspect of the invention, the gradation correction processing means in the image processor can create the correction curve smoother than those created by using an interpolation operation linear interpolation quickly by easier calculation than the case of using spline interpolation or n-order function approximation. The output characteristics of the correction curve per first section having the both ends of the specified density values is analogous to the output characteristics of the reference correction curve in the second section having the both ends of the correction values to the same specified density values on the correction curve as those of the both ends of the first section. Thereby, an output section whose output characteristics based on the reference correction curve is almost linear has the almost linear output characteristics even after when a correction is made based on the created correction curve.

According to the first aspect of the invention, the gradation correction processing means in the image processor finds a part of the correction curve by means of interpolation operation of expanding or compressing a part of the reference correction curve in the direction parallel to the axis of the density value by moving it in that direction when creating the correction curve by using the reference correction curve and the correction amount to the specified density values. It allows a smooth correction curve to be obtained quickly by simpler calculation than the case of using the spline interpolation or the n-order function approximation for the interpolation operation. Still more, because the output characteristics of the correction curve is analogous with the output characteristics of the reference correction curve per each section, the reliability of the correction curve may be improved.

In a second aspect of the invention, the image processor is characterized in that during the interpolation operation, the gradation correction processing means:

(a) calculates a third section $\Delta XB_i$ which is a section having input density values $XB(YB_i)$ and $XB(YB_{i+1})$ on the reference correction curve to the correction values $YP(XP_i)$ and $YP(XP_{i+1})$ to the specified density values, as both ends thereof;

(b) correlates the input density value $J_i$ within the third section with the input density value $XX(J_i)$ within the first section so that the both ends of the third section $\Delta XB_i$ coincide with the both ends of the first section $\Delta XP_i$; and (c) uses the correction value $YB(J_i)$ to the input density value $J_i$ within the third section on the reference correction curve as the correction value $YP(XX(J_i))$ on the correction curve to the input density value $XX(J_i)$ within the first section correlated with the input density value $J_i$.

According to the second aspect of the invention, the gradation correction processing means in the image processor can calculate the correction value to the input density value within the first section on the correction curve, based on the input density value within the third section and the correction value to the input density value on the correction curve.

In a third aspect of the invention, the image processor is characterized in that in determining input value density $XX(J_i)$ within the first section correlated with the input density value $J_i$ within the third section, the gradation correction processing means:

(a) calculates a value obtained by adding a specified density value $XP_i$ at one end of the first section to a product of a ratio of a width $XP_{i+1}-XP_i$ of the first section to a width $XB(YB_{i+1})-XB(YB_i)$ of the third section and a distance $J_i-XB(YB_i)$ from one end of the third section to the input density value within the third section; and (b) rounds the calculated sum to a predetermined number of digits and correlates the input density value $XX(J_i)$ within the first section which is equal to the rounded value, to the input density value $J_i$ within the third section.

According to the third aspect of the invention, when the number of digits of the input density value is predetermined, the gradation correction processing means in the image processor can calculate the correction values to the input density values within the first section on the correction curve, based on the input density values within the third section and the correction values to the input density values.

In a fourth aspect of the invention, the image processor is characterized in that in carrying out the interpolation operation in which the shape of the correction curve at one part within the first section $\Delta XP_i$ assumes a shape in which a part of the reference correction curve within the second section $\Delta YB_i$ is extended in the direction X parallel to the axis of density value, the gradation correction processing means finds a correction value on the correction curve to the remaining input density value other than the input density value $XX(J_i)$ correlated with the input density value $J_i$ within the third section among all input density values within the first section, by means of interpolation operation.

According to the fourth aspect of the invention, although a part of all input density values within the first section cannot be correlated with the input density values within the third section when the first section is wider than the third section, the gradation correction processing means of the image processor can find the correction value to the input density value within the first section which is not correlated with the input density value within the third section readily by the interpolation operation.

In a fifth aspect of the invention, the image processor is characterized in that in carrying out the interpolation operation in which the shape of the correction curve of a part within the first section $\Delta XP_i$ assumes a shape in which a part of the reference correction curve within the second section $\Delta YB_i$ is compressed in the direction X parallel to the axis of density value, when a plurality of input density values within the third section are correlated to the single input density value $XX(J_i)$ within the first section, the gradation correction processing means uses a correction value to an input density value calculated at last among the plurality of input density values within the third section on the reference correction curve, as the correction value $YP(XX(J_i))$ on the correction curve to the input density value $XX(J_i)$ within the first section.

According to the fifth aspect of the invention, the gradation correcting process in the image processor can create the correction curve more quickly when the first section is narrower than the third section.

In a sixth aspect of the invention, the image processor is characterized in that in carrying out the interpolation operation in which the shape of the correction curve of a part within the first section $\Delta XP_i$ assumes a shape in which a part of the reference correction curve within the second section $\Delta YB_i$ is compressed in the direction X parallel to the axis of density value, when a plurality of input density values within the third section are correlated to the single input density value $XX(J_i)$ within the first section, the gradation correction processing means uses a center value of the correction values on the reference correction curve to plurality of input density values within the third section, as the correction value $YP(XX(J_i))$ on the correction curve to the input density value $XX(J_i)$ within the first section.

According to the sixth aspect of the invention, the gradation correction processing means in the reference correction curve can create the correction curve more suitable to the image outputting means because the shape of the part of the correction curve within the first section created by the gradation correction processing means hardly gets out of the shape as compared to the shape in which the part of the reference correction curve in the second section is compressed in the horizontal direction when the first section is narrower than the third section.

In a seventh aspect of the invention, the image processor is characterized in that one density value among the plurality of specified density values is a lower limit density value within the range of the input density values.

According to the seventh aspect of the invention, the correction value to the input density value smaller than the specified density value other than the lower limit density value may become a more suitable value in the correction curve created by the gradation correction processing means within the image processor. Thereby, the gradation correction processing means can correct the gradation more adequately.

In an eighth aspect of the invention, the image processor is characterized in that one density value among the plurality of specified density values is an upper limit density value within the range of the input density values.

According to the eighth aspect of the invention, the correction value to the input density value greater than the specified density value other than the upper limit density value may become a more suitable value in the correction curve created by the gradation correction processing means within the image processor. Thereby, the gradation correction processing means can correct the gradation more adequately.

In a ninth aspect of the invention, the image processor is characterized in that in creating the correction curve, the gradation correction processing means always uses a value defined in advance per each input density value as a correction value on the correction curve to each input density value located at least in one of the section from the upper limit density value within the range of the input density values to the first input density value set in advance and the section from the lower limit density value within the range of the input density values to the second input density value set in advance.

According to the ninth aspect of the invention, the image processor can always maintain the output characteristics within the section to the characteristics (saturated density) set in advance when, on the correction curve the correction value to each input density value within the section from the upper limit density value to the first input density value set in advance is always the value set in advance. The image processor can also always maintain the output characteristics within the section to the characteristics (not outputted) set in advance when on the correction curve the correction value to each input density value within the section from the lower limit density value to the second input density value set in advance is always the value set in advance.

In a tenth aspect of the invention, the image processor is characterized in that the gradation correction processing means selects any one reference correction curve among a plurality of reference correction curves corresponding to the output characteristics intrinsic to the image outputting means and uses the selected reference correction curve in creating the correction curve when the reference correction curve storing means stores the plurality of reference correction curves.

According to the tenth aspect of the invention, the reference correction curve selected corresponding to the output characteristics intrinsic to the image outputting means is used in creating the correction curve in the image processor. Thereby, the gradation correction processing means can create the correction curve more suitable to the output characteristics intrinsic to the image outputting means.

In an eleventh aspect of the invention, the image processor is characterized in that the gradation correction processing means:

(a) causes the image outputting means to output the image pattern of the plurality of specified density values without performing the gradation correcting process;

(b) causes the image inputting means to read the density values of the outputted image pattern;

(c) compares the read density values with the reference characteristic curve set in advance and correlated with each of the reference correction curves; and (d) selects the reference correction curve correlated to the reference characteristic curve closest to the read density values.

According to the eleventh aspect of the invention, the reference correction curve is selected based on the result of the image pattern of the specified density value outputted by the image output unit as it is. Thereby, the gradation correction processing means within the image processor can select the most adequate reference correction curve to the output characteristics intrinsic to the image outputting means.

In a twelfth aspect of the invention, the image processor is characterized in that the correction amount corresponding to the specified density value is a first correction amount which is a correction amount based on the output characteristics intrinsic to the image outputting means.

According to the twelfth aspect of the invention, the gradation correction processing means within the image processor can carry out the adequate γ correction process based on the output characteristics intrinsic to the image outputting means.

In a thirteenth aspect of the invention, the image processor further comprises adjustment amount input means for inputting an adjustment amount set in connection with the gradation correcting process of the image and is characterized in that the correction amount to the specified density value is a second correction amount which is a correction amount based on the inputted adjustment amount.

According to the thirteenth aspect of the invention, the correction amount corresponding to the specified density value is defined based on the adjustment amount in the image processor. When the adjustment amount is set corresponding to the output characteristics intrinsic to the image outputting means, the gradation correction processing means can carry out the adequate γ correction process based on the output characteristics intrinsic to the image outputting means. When the adjustment amount is an adjustment amount related to the process for correcting the density value desired by the user of the image forming apparatus, the gradation correction processing means can execute the process for correcting the density value based on the adjustment amount simultaneously with the γ correction process (the case of correcting the output characteristics intrinsic to the image outputting means without including the correction by the adjustment amount is called as the γ correction process in the present invention)

In a fourteenth aspect of the invention, the image processor further comprises adjustment amount inputting means for inputting an adjustment amount set in connection with the gradation correcting process of the image, wherein the correction amount corresponding to the specified density value is a sum of the first correction amount which is the correction amount based on the output characteristics intrinsic to the image outputting means and the second correction amount which is the correction amount based on the inputted adjustment amount.

According to the fourteenth aspect of the invention, the gradation correction processing means within the image processor can execute the adequate γ correction process based on the output characteristics intrinsic to the image outputting means and can execute the process for correcting the density value based on the adjustment amount.

In a fifteenth aspect of the invention, the image processor is characterized in that the second correction amount is a total sum of correction amounts defined per each adjustment amount when a plurality of adjustment amounts are inputted from the adjustment amount inputting means.

According to the fifteenth aspect of the invention, the gradation correction processing means within the image processor can calculate the second correction amount readily when the correction amounts are inputted in overlap.

In a sixteenth aspect of the invention, the image processor is characterized in that it further comprises target characteristic curve storing means for storing a target characteristic curve indicative of predetermined changes of the density of the pixel of the image outputted by the image outputting means to the input density value;

the gradation correction processing means:

(a) performs the gradation correcting process using the reference correction curve to the image pattern of each of specified density values $XP_i$;

(b) causes the image outputting means to output the image pattern of each specified density value $XP_i$ whose gradation has been corrected;

(c) causes the image inputting means to read the density $YM_i$ of the image pattern of each outputted specified density value; and (d) compares the read density $YM_i$ with the target characteristic curve and decides the first correction amount based on the comparison result in determining the first correction amount.

According to the sixteenth aspect of the invention, the gradation correction processing means within the image processor can set the most adequate first correction amount to the output characteristics intrinsic to the image outputting means.

In a seventeenth aspect of the invention, the image processor is characterized in that in comparing the density $YM_i$ of the image pattern of each specified density value read as described above with the target characteristic curve, the gradation correction processing means:

(a) calculates the input density value $XB(YM_i)$ on the target characteristic curve to the density $YM_i$ of the image pattern of each specified density value;

(b) uses the correction value $YB(XP_i)$ on the reference correction curve to the specified density value $XP_i$, as a value $V(YM_i)$ on an imaginary curve to the calculated input density value $XB(YM_i)$;

(c) calculates a value $V(XP_i)$ on the imaginary curve to each specified density value $XP_i$ by means of interpolation operation of causing a shape of the imaginary curve within a fourth section $\Delta XB(YM_i)$ having as both ends thereof, input density values $XB(YMa)$ and $XB(YM_b)$ which are located at both ends of the specified density value $XP_i$ and to which values on an imaginary curve have been calculated, to coincide with a shape obtained by expanding or compressing a fifth section $\Delta V(YM_a)$ having as both ends thereof, the values $V(YM_a)$ and $V(YM_b)$ on the imaginary curve to the input density values of the both ends of the fourth section, in the direction X parallel to the axis of density value; and (d) uses the difference between the value $V(XP_i)$ on the imaginary curve to the calculated specified density value and the correction value $YB(XP_i)$ on the reference correction curve to the specified density value, as a first correction amount $s_i$ corresponding to the specified density value $XP_i$.

According to the seventeenth aspect of the invention, the gradation correction processing means within the image processor calculates the value on the imaginary curve to the specified density value by means of the interpolation operation corresponding to the output characteristics based on the part of the reference correction curve within the first section whose end is the specified density value. The interpolation operation executed in setting the first correction amount is realized by the interpolation operation for extending or compressing the part of the reference correction curve by moving it in the direction parallel to the axis of density value. Thereby, the gradation correction processing means can calculate the more adequate correction amount as the first correction amount based on the output characteristics intrinsic to the image outputting means.

In an eighteenth aspect of the invention, the image processor is characterized in that when the read density of the image pattern of the specified density value is out of the preset range of the density where the image inputting means is liable to erroneously read, the gradation correction processing means carries out calculation of values on the imaginary curve using the density and when the read density of the image pattern of the specified density value is within the range of the density, the gradation correction processing means stops the calculation of values on the imaginary curve using the density.

According to the eighteenth aspect of the invention, the gradation correction processing means within the image processor stops the calculation of values on the imaginary curve using the density when the density which is difficult to accurately distinct by the image outputting means is obtained in reading the image pattern. As the density which is difficult to distinct, there may be cited the density which is far higher than the lower limit density and the density which is far lower than the saturation density within the range of the density readable by the image inputting means. The image pattern of the density which is far higher than the lower limit density is a thin color for human eyes. The image pattern of the density which is far lower than the saturation density is a slightly thinner color for human eyes as compared to the saturation density. The image inputting means erroneously reads the density of the image pattern whose density is far higher than the lower limit density as the lower limit density. The image inputting means also erroneously recognizes the density of the image pattern of the density which is far lower than the saturation density as the saturation density. Because the calculation of values on the imaginary curve using the density which is hard to be distinguished is not carried out, the first correction amount corresponding to the specified density value within the low density part and the high density part in the range of the density which can be outputted by the image outputting means becomes more adequate.

In a nineteenth aspect of the invention, the image processor is characterized in that the gradation correction processing means calculates the correction value on the correction curve by using densities $YM_i$ and $YM_{i+1}$ when the difference obtained by subtracting read density $YM_i$ of the image pattern of the specified density value $XP_i$ from read density $YM_{i+1}$ of the image pattern of the other specified density value $XP_{i+1}$ which is greater than the specified density value $XP_i$ is a positive value and stops the calculation of values on the imaginary curve using the densities $YM_i$ and $YM_{i+1}$ when the difference is a negative value.

According to the nineteenth aspect of the invention, the gradation correction processing means within the image processor stops the calculation of values of the imaginary curve using the specified density value when the difference between the read densities of the image patterns of the two specified density values is negative. It is because the read density of the image pattern is considered to have become unnatural due to the unstability of the image outputting means or the density measuring error of the image inputting means when the difference is negative. Because the calculation of values on the imaginary curve using the difference is not carried out when the difference is negative, the gradation correction processing means can create a smoother correction curve.

In a twentieth aspect of the invention, the image processor is characterized in that the gradation correction processing means calculates the correction value on the correction curve by using densities $YM_i$ and $YM_{i+1}$ when the difference obtained by subtracting read density $YM_i$ of the image pattern of the specified density value $XP_i$ from read density $YM_{i+1}$ of the image pattern of the other specified density value $XP_{i+1}$ which is greater than the specified density value $XP_i$ is a positive value and when the difference is negative, calculates an average density of the density $YM_i$ of the specified density value and the density $YM_{i+1}$ of the other specified density value, calculates an input density value on the target characteristic curve to the average density and uses the correction value on the reference correction curve, corresponding to the average input density value of the specified density value $XP_i$ and the other specified density value $XP_{i+1}$ as a value on the imaginary curve to the calculated input density value.

According to the twentieth aspect of the invention, when the difference between the read densities of image patterns of two specified density values is negative, the gradation correction processing means within the image processor finds values on the imaginary curve by using the average density of the densities and the average input density value of the specified density values. Thereby, gradation correction processing means drum can prevent data to be used in the interpolation operation from decreasing too much in the interpolation operation in calculating the first correction amount.

In a twenty-first aspect of the invention, the image processor is characterized in that when the image is a color image, the reference correction curve and the correction amount corresponding to the specified density value are set per each of a plurality of color components.

According to the twenty-first aspect of the invention, the gradation correction processing means within the image processor can execute the gradation correcting process adequately per each color component.

In a twenty-second aspect of the invention, the image processor is characterized in that it further comprises halftone generating processing means for performing a dither type halftone generating process to the image, wherein the reference correction curve and the correction amount corresponding to the specified density value are set per size of a dither matrix which can be used by the halftone generating processing means.

According to the twenty-second aspect of the invention, the gradation correction processing means within the image processor can execute the gradation correcting process adequately per size of each dither matrix.

In a twenty-third aspect of the invention, an image processor comprises image inputting means for inputting an image, gradation correction processing means for performing a gradation correcting process using a correction curve to the inputted image and image outputting means for outputting the image for which the gradation correcting process has been performed, the image inputting means supplying input density values of pixels composing the image, to the gradation correction processing means, the gradation correction processing means supplying correction values to the input density values on the correction curve, to the image outputting means, the image processor further comprising:

curve storing means for storing the correction curve,
wherein the correction curve indicates a change of the correction value to the input density value, and is prepared, based on the reference correction curve indicative of a preset change of the correction value to the input density value and a target characteristic curve indicative of a preset change to the input density value of the density of the pixel outputted by the image outputting means, in such a manner that:

(a) an image pattern of each of a plurality of specified density values $XP_i$ and $XP_{i+1}$ which are the input density values specified at intervals from each other within the range of the input density values is subjected to the gradation correcting process using the reference correction curve;

(b) an image pattern of each of the specified density values $XP_i$ and $XP_{i+1}$ whose gradation has been corrected is outputted by the image outputting means;

(c) densities $YM_i$ and $YM_{i+1}$ of the outputted image pattern of each of the specified density values $XP_i$ and $XP_{i+1}$ is read;

(d) input density values $XB(YM_i)$ and $XB(YM_{i+1})$ on the target characteristic curve to the densities $YM_i$ and $YM_{i+1}$ of the image pattern of the respective specified density values are calculated;

(e) correction values $YB(XPI)$ and $YB(XP_{i+1})$ on the reference correction curve to the specified density values $XP_i$ and $XP_{i+1}$ are adopted as correction values $YP(YM_i)$ and $YP(YM_{i+1})$ on the correction curve to the calculated input density values $XB(YM_i)$ and $XB(YM_{i+1})$; and (f) a correction value on the correction curve to the input density value within a section $\Delta XB(YM_i)$ having the calculated input density values $XB(YM_i)$ and $XB(YM_{i+1})$ as both ends thereof is calculated by an interpolation operation for causing a shape of a part of the correction curve within the section $\Delta XB$ ($YM_i$) to coincide with a shape obtained by extending or compressing a part of the reference correction curve within a section $\Delta V(YM_i)$ having as both ends thereof, values $V(YM_i)$ and $V(YM_{i+1})$ on an imaginary curve to the calculated input density values $XB(YM_i)$ and $XB(YM_{i+1})$, in the direction X of the axis of density value.

According to the twenty-third aspect of the invention, in the image processor, the correction curve used by the gradation correction processing means is smoother than the correction curve created by using linear interpolation for the interpolation operation and is as smooth as the correction curve created by using spline interpolation or n-order function approximation for the interpolation operation. The correction curve of the 23-rd aspect of the invention may be created quickly by relatively simpler calculation than the interpolation operation using the spline interpolation or the n-order function approximation. The output characteristics of the correction curve per first section having the both ends of the specified density values is analogous to the output characteristics of the reference correction curve in the second section having the both ends of the correction values on the correction curve to the same specified density values as those of the both ends of the first section. Thereby, an output section where the output characteristics based on the reference correction curve is almost linear has the almost linear output characteristics even after when a correction based on the created correction curve has been made. Further, because the image processor of the twenty-third aspect of the invention creates and stores the correction curve itself in advance, it can execute the gradation correcting process faster than the image processor of the first aspect of the invention by the time of creating the correction curve.

BRIEF DESCRIPTION OF THE DRAWINGS

Other and further objects, features, and advantages of the invention will be more explicit from the following detailed description taken with reference to the drawings wherein:

FIG. 12 is a flowchart showing a main control process of an half-tone output gradation processing section within the image processor in FIG. 2;

FIGS. 15A through 15D are graphs for explaining processing methods in expanding or compressing the reference correction curve in the interpolation in FIG. 4;

FIG. 16 is a graph for explaining a case of including upper and lower limit density values in the specified density value in the interpolation in FIG. 4;

DETAILED DESCRIPTION OF THE PREFERRED EMBODIMENTS

Figure 1:
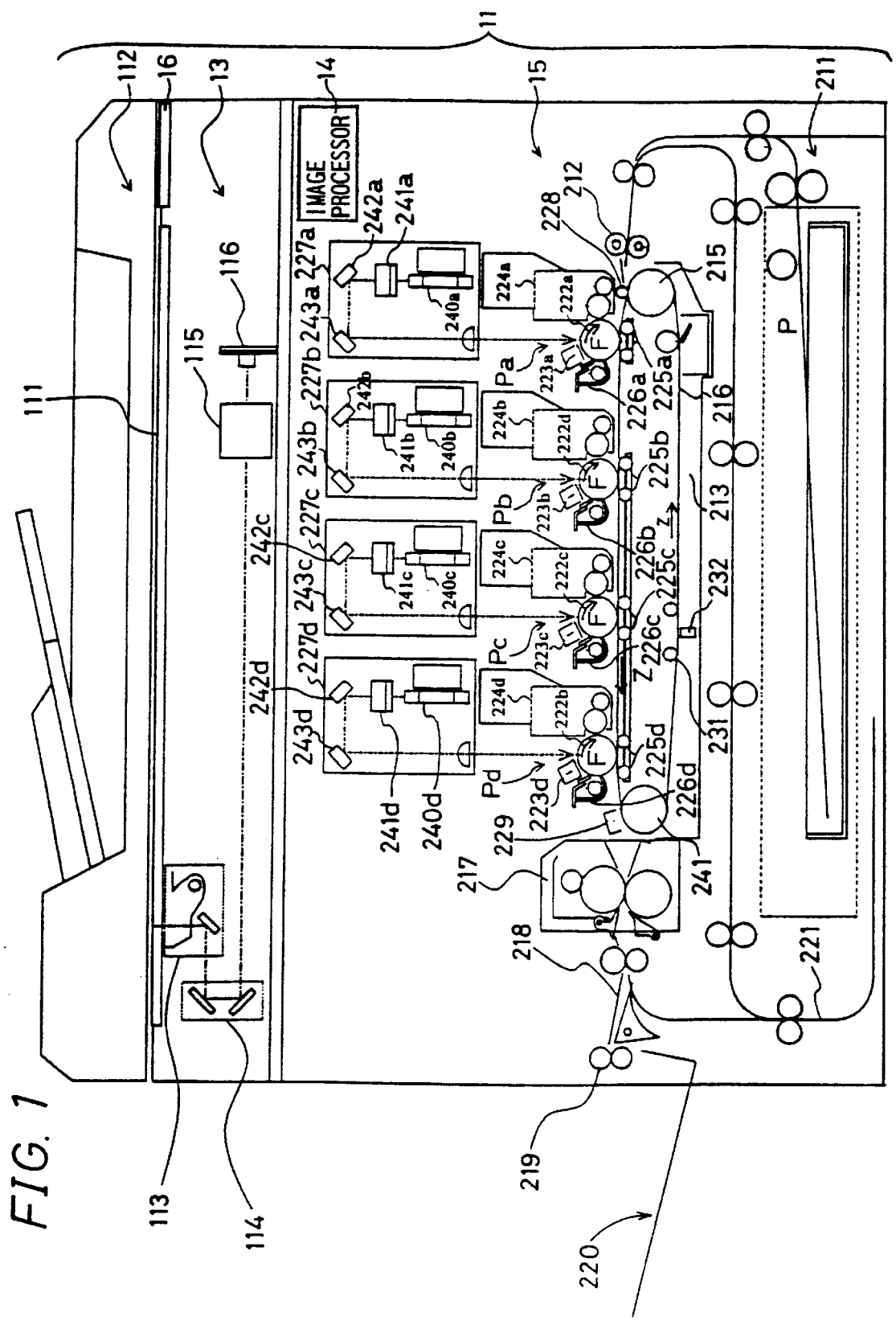
FIG. 1 is a front section view showing the structure of an image forming apparatus provided with an image processor according to one embodiment of the invention.

Now referring to the drawings, preferred embodiments of the invention are described below.

FIG. 1 is a schematic front section view showing the structure of an image forming apparatus 11 provided with an image processor according to one embodiment of the invention. The image forming apparatus 11 may be realized by a digital color copier. The image forming apparatus 11 is provided with an image input unit 13 which is image inputting means, an image processor 14 and an image output unit 15 which is image outputting means within the main body thereof. A transparent platen 111 and a control panel 16 are provided on the upper surface of the main body of the image forming apparatus 11.

An reversing automatic document feeder (RADF) 112 is attached on the upper surface of the platen 111. The reversing automatic document feeder 112 is supported so as to be openable with respect to the platen 111 and has a predetermined positional relationship to the surface of the platen 111. The reversing automatic document feeder 112 conveys the original so that one surface of the original faces to the image input unit 13 at predetermined position of the platen 111 and conveys the original toward the platen 111 while reversing the original so that the other surface of the original faces to the image input unit 13 at the predetermined position of the platen 111 after ending to read one surface. The operations for conveying and reversing the original in the reversing automatic document feeder 112 is controlled in connection with the overall operation of the image forming apparatus 11.

The image input unit 13 is disposed under the platen 111 to read the image of the original conveyed on the platen 111 by the reversing automatic document feeder 112. The image input unit 13 is provided with an original scanner which reciprocates in parallel to the under surface of the platen 111, an optical lens 115 and a CCD (charge coupled device) line sensor 116 which is a photoelectric transforming device.

The original scanner comprises a first scanning unit 113 and a second scanning unit 114. The first scanning unit 113 has an exposure lamp for exposing the surface of the original and a first mirror for deflecting a reflected light image from the original in a predetermined first direction. The first scanning unit 113 reciprocates in parallel to the under surface of the platen 111 while keeping a certain distance to the under surface of the platen 111. The second scanning unit 114 has second and third mirrors for deflecting the reflected light image from the original deflected by the first mirror of the first scanning unit 113 into a predetermined second direction. The second scanning unit 114 reciprocates in parallel with the under surface of the platen 111 while keeping a predetermined velocity-wise relationship with the first scanning unit 113.

The optical lens 115 reduces the reflected light image deflected by the third mirror of the second scanning unit 114 and images the reduced reflected light image on predetermined position of the CCD line sensor 116. The CCD line sensor 116 photoelectrically transforms the imaged reflected light images one after another to output an analog image signal which is an electrical signal. The CCD line sensor 116 provided in the image forming apparatus 11 is a color CCD line sensor of three lines in concrete. The three line color CCD line sensor reads monochrome or color images, separates the reflected light image into images of color components of red (R), green (G) and blue (B) and outputs a reflectance signal composed of signals corresponding to those images of three color components. The reflectance signal generated by the CCD line sensor 116 is supplied to the image processor 14. It is noted that the three colors of red, green and blue will be denoted as "RGB" in the following explanation in general.

The image processor 14 performs predetermined processes described later on the supplied RGB reflectance signal. As a result, the RGB reflectance signal is transformed into digital image signals (hereinafter denoted as "image data") composed of signals corresponding to the images of color components of cyan (C), magenta (M), yellow (Y) and black (K), respectively. It is noted that the four colors of cyan, magenta, yellow and black will be denoted as "CMYK" in the following explanation in general.

A sheet feeder mechanism 211 provided with a paper tray is provided under the image output unit 15. It is noted that cut-sheet papers, i.e., recording media, are used as papers P in the image forming apparatus 11 of the present embodiment. In brief outline, the paper feeding mechanism 211 separates the paper P within the paper tray one by one and supplies it to the image output unit 15. When the paper is printed on the double sides, the paper feeding mechanism 211 conveys the paper P on which an image is formed on one side so that it is supplied again to the image output unit 15 in conformity with the image forming timing of the image output unit 15. When the paper P fed from the paper tray is supplied within a guide of the sheet conveying route within the paper feeding mechanism 221, a sensor provided within the sheet conveying route detects the edge portion of the paper P and outputs a detection signal.

A pair of resist rollers 212 are disposed in front of the image output unit 15. The resist rollers 212 stop the conveyed paper P once based on the detection signal from the sensor within the sheet conveying route. The separated and supplied paper P is then conveyed to the image output unit 15 at the timing of supply controlled by the resist rollers 212.

The image output unit 15 comprises a first image forming section Pa, a second image forming section Pb, a third image forming section Pc, a fourth image forming section Pd, a transfer conveyor belt mechanism 213 and a fixing unit 217. The transfer conveyor belt mechanism 213 is disposed at the lower part of the image output unit 15. The transfer conveyor belt mechanism 213 comprises a driving roller 214, a slave roller 215 and a transfer conveyor belt 216 stretched between those rollers 214 and 215 so as to extend almost in parallel. A pattern image detecting unit 232 is provided closely under the transfer conveyor belt 216.

The first image forming section pa, the second image forming section Pb, the fourth image forming section Pc and the fourth image forming section Pd are provided above and closely to the transfer conveyor belt 216 within the image output unit 15 one by one from the upstream side of the sheet conveying route. The fixing unit 217 is provided at the downstream side of the transfer conveyor belt mechanism 213 in the sheet conveying route. A paper adsorbing electrifier 228 is provided between the first image forming section Pa and the paper feeding mechanism 211. A paper detaching deelectrifier 229 is provided between the fourth image forming section Pd and the fixing unit 217 and at the position almost right above the driving roller 214.

In brief outline, the transfer conveyor belt mechanism 213 is constructed so as to convey the paper P supplied by the resist rollers 212 while electrostatically adsorbing to the transfer conveyor belt 216 and operates concretely as follows. The paper adsorbing electrifier 228 electrifies the surface of the transfer conveyor belt 216. The transfer conveyor belt 216 is driven in the direction indicated by an arrow Z in FIG. 1 by the driving roller 214. Therefore, the transfer conveyor belt 216 conveys the paper P fed through the paper feeding mechanism 211 sequentially through the first image forming section Pa, the second image forming section Pb, the third image forming section Pc and the fourth image forming section Pd while carrying the paper P. Because the surface of the transfer convey or belt 216 is electrified by the paper adsorbing electrifier 228, the transfer conveyor belt mechanism 213 can convey the paper P stably without causing misregistration from the first image forming section Pa to the fourth image forming section Pd while adsorbing the paper P supplied from the paper feeding mechanism 211 firmly to the transfer conveyor belt 216. AC current is applied to the charge-removing device 229 for separating paper to separate the electrostatically adsorbed paper P from the transfer conveyor belt 216.

The first image forming section Pa, the second image forming section Pb, the third image forming section Pc and the fourth image forming section Pd have substantially the same structure from each other. The respective image forming units Pa, Pb, Pc and Pd comprise photosensitive drums 222a, 222b, 222c and 222d, respectively, which are turned in the directions indicated by arrows F in FIG. 1. Electrifiers 223a, 223b, 223c and 223d, developers 224a, 224b, 224c and 224d, transfer members 225a, 225b, 225c and 225d and cleaning units 226a, 226b, 226c and 226d are disposed around the photosensitive drums 222a through 222d one after another along the turning direction F of the photosensitive drums 222a through 222d.

Laser beam scanner units 227a, 227b, 227c and 227d are provided above the photosensitive drums 222a through 222d, respectively. The laser beam scanner units 227a through 227d have semiconductor laser devices, polygon mirrors 240a, 240b, 240c and 240d, i.e., deflectors, fθ lenses 241a, 241b, 241c and 241d, two mirrors 242a, 242b, 242c and 242d and 243a, 243b, 243c and 243d, respectively. It is noted that no semiconductor laser device is shown in FIG. 1.

A signal corresponding to an image of the black color component of the color original image within the image data from the image processor 14 is inputted to the laser beam scanner unit 227a of the first image forming section Pa. A signal corresponding to an image of the cyan color component of the color original image within the image data is inputted to the laser beam scanner unit 227b of the second image forming section Pb. A signal corresponding to an image of the magenta color component of the color original image within the image data is inputted to the laser beam scanner unit 227c of the third image forming section Pc. A signal corresponding to an image of the yellow color component of the color original image within the image data is inputted to the laser beam scanner unit 227d of the fourth image forming section Pd.

The electrifiers 223a through 223d uniformly electrify the photosensitive drums 222a through 222d, respectively. The semiconductor laser device of the laser beam scanner units 227a through 227d emits laser beams modulated corresponding to the signal supplied to the respective units. The polygon mirrors 240a through 240d deflect the laser beams from the semiconductor laser devices in the main scan direction set in advance. The fθ lenses 241a through 241d and the mirrors 242a through 242d and 243a through 243d image the laser beams deflected by the polygon mirrors 240a through 240d on the surface of the electrified photosensitive drums 222a through 222d. Thereby, electrostatic latent images corresponding to the four color components of the color original image are formed on the photosensitive drums 222a through 222d.

Black toner is stored in the developing unit 224a of the first image forming section Pa. Cyan toner is stored in the developing unit 224b of the second image forming section Pb. Magenta toner is stored in the developing unit 224c of the third image forming section Pc. Yellow toner is stored in the developing unit 224d of the fourth image forming section Pd. The developers 224a through 224d develop the electrostatic latent images on the photosensitive drums 222a through 222d by the toners stored as described above. Thereby, the original image is reproduced as black, cyan, magenta and yellow toner images by the image output unit 15.

The transfer members 225a through 225d transfer the toner images on the photosensitive drums 222a through 222d on one face of the paper P conveyed by the transfer conveyor belt 216. The cleaning units 226a through 226d remove the toner remaining on the photosensitive drums 222a through 222d after the transfer, respectively.

After completing the transfer of the toner image at the fourth image forming section Pd, the paper P is detached from the transfer conveyor belt 216 from the edge portion by the deelectrifier 229 and is guided to the fixing unit 217. The fixing unit 217 fixes the toner images transferred on the paper P to the paper P.

The paper P which has passed through the nip between the fixing rollers of the fixing unit 217 passes through a conveying direction switching gate 218. The conveying direction switching gate 218 selectively switches the conveying path of the paper P after fixing the toner image between a first path for discharging the paper P to the outside of the main body of the image forming apparatus 11 and a second path for re-supplying the paper P toward the image output unit 15. When the conveying path is switched to the first path by the conveying direction switching gate 218, the paper P is discharged to a discharged paper tray 220 attached to the outside wall of the main body of the image forming apparatus 11 by a discharge roller. When the conveying path is switched to the second path by the conveying direction switching gate 218, the paper P is conveyed to a switch-back conveying path 221, is reversed by the switch-back conveying path 221 and is then supplied again to the image output unit 15 via the paper feeding mechanism 211.

While optical writing to the photosensitive drums 222a through 222d has been carried out by scanning and exposing the laser beams by the laser beam scanner units 227a through 227d in the explanation described above, an LED (light emitting diode) head which is a writing optical system comprising a light emitting diode array and an image forming lens array may be used instead of the laser beam scanner units 227a through 227d. The LED head generates no sound because its size is small as compared to the laser beam scanner units and it has no movable part. Therefore, the LED head may be suitably used in a tandem type digital color image forming apparatus which requires a plurality of optical writing units. Further, while the image output unit 15 has been realized by the electrophotographic type printer in the explanation described above, the image output unit 15 may be realized by another type of apparatus such as an ink-jet type printer instead of the electrophotographic printer.

Figure 2:
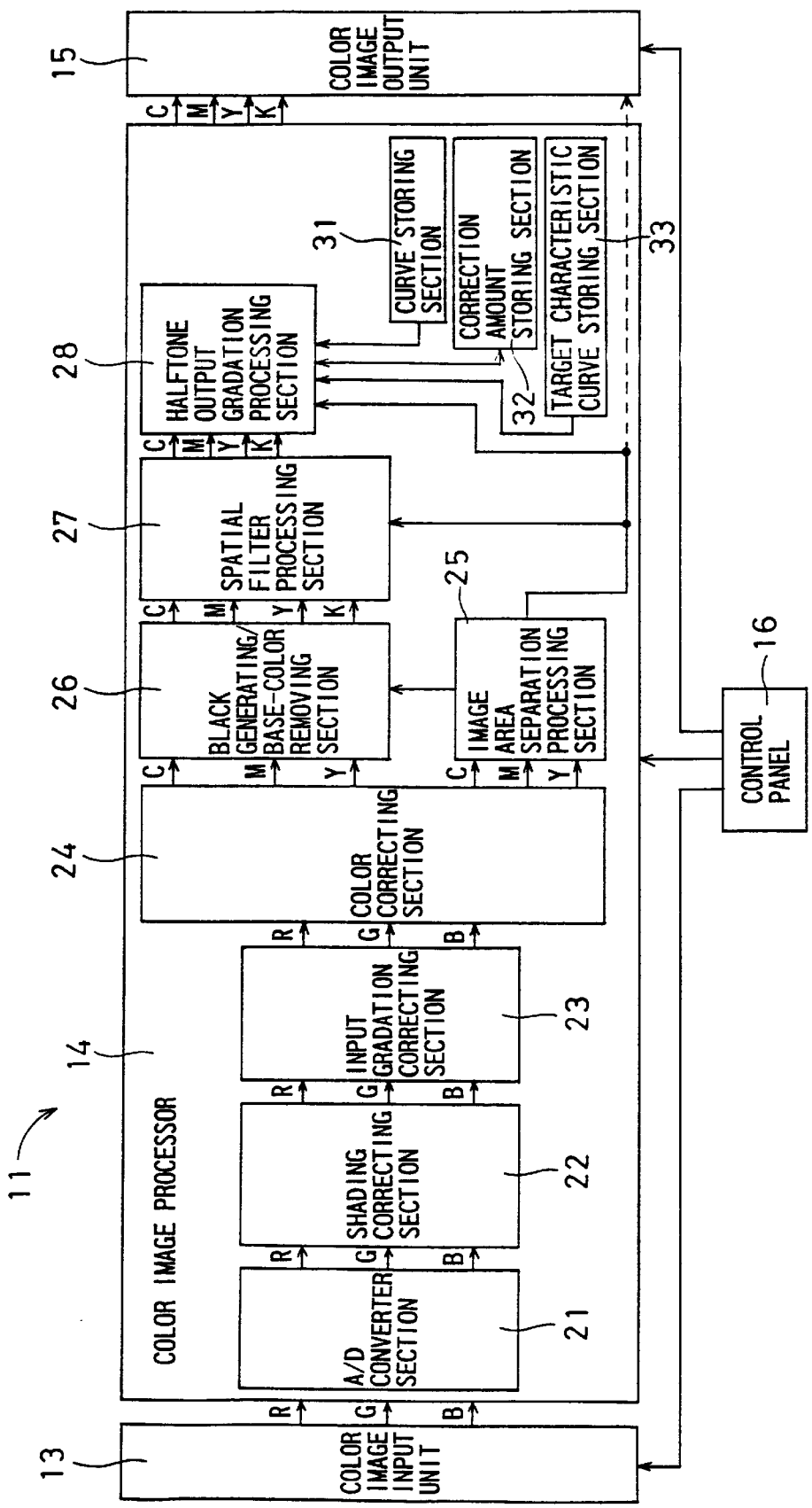
FIG. 2 is a block diagram showing the structure of the image processor within the image forming apparatus in FIG. 1.

FIG. 2 is a block diagram showing the structure of the image processor 14 within the image forming apparatus 11 in FIG. 1. The image processor 14 comprises an analog/digital (hereinafter abbreviated as "A/D") converter section 21, a shading correcting section 22, an input gradation correcting section 23, a color correcting section 24, an image area separating and processing section 25, a black generating/base-color removing section 26, a spatial filter processing section 27, a halftone output gradation processing section 28, a reference correction curve storing section (reference correction curve storing means, hereinafter abbreviated as a "curve storing section") 31, and a correction amount storing section (correction amount storing means) 32. The curve storing section 31 may be realized by a nonvolatile storage such as an ROM (read only memory) from which at least data can be read. The correction amount storing section 32 may be realized by a storage such as an RAM (random access memory) from/to which data can be read/written or preferably by a nonvolatile storage from/to which data can be read/written.

The A/D converter section 21 converts the RGB reflectance signals supplied from the image input unit 13 into digital signals. The shading correcting section 22 performs a shading correcting process to the A/D converted reflectance signals. The shading correcting process is carried out to remove various distortions generated in the image signals due to the structure of the illumination system, image forming system and photographing system of the image input unit 13.

The input gradation correcting section 23 performs an input gradation correcting process to the reflectance signals to which the shading correcting process has been performed. The input gradation correcting process is a process for converting the reflectance signals into signals such as density signals which can be readily handled by the image processor 14. The input gradation correcting section 23 may perform a color balance process to the reflectance signals further.

The color correcting section 24 converts the RGB density signals to CMY density signals and performs a color correcting process to the CMY density signals to realize the fidelity in reproducing the colors in the image output unit 15. In concrete, the color correcting process is a process for removing burbidity of color based on the spectroscopic characteristics of CMY toners containing unnecessary absorbing components from the CMY density signals.

The image area separation processing section 25 carries out the image area separating process based on the CMY density signals outputted from the color correcting section 24. The result of separation obtained by the image area separation processing section 25 is supplied to the black generating/base-color removing section 26, the spatial filter processing section 27 and the halftone output gradation processing section 28. The result of separation obtained by the image area separation processing section 25 may be supplied also to the image output unit 15.

The black generating/base-color removing section 26 carries out an black generating process for generating a black color signal based on the CMY color signals composing the density signals outputted from the color correcting section 24. The black generating/base-color removing section 26 also performs a ground color removing process to the CMY color signals. The ground color removing process is a process for obtaining new CMY color signals by subtracting the black color signal generated by the ink generating process from the CMY color signals. As a result of these processes, the CMY density signals are converted into image data which are image signals composed of the CMYK color signals.

The spatial filter processing section 27 performs a spatial filtering process using a digital filter to the CMYK image data obtained by the black generating/base-color removing section 26. Because the characteristics of spatial frequency of the image may be corrected by this process, it is possible to prevent blur or graininess deterioration from occurring in the image outputted by the image output unit 15.

The halftone output gradation processing section 28 performs a gradation correcting process and a halftone generating process to the CMYK image data after performing the spatial filtering process while making reference to the stored contents of the curve storing section 31 and the correction amount storing section 32. The halftone generating process is a process for realizing the gradation of each pixel by dividing the image into a plurality of pixels. The halftone output gradation processing section 28 may also carry out a process for converting a density value of the image data into a network point area ratio which is a characteristic value of the image output unit 15. The density signals processed by the halftone output gradation processing section 28 are supplied to the image output unit 15.

When characters and pictures are mixed in the original image read by the image input unit 13, the image area separation processing section 25 separates the image into a character area from which the image is sampled as black characters and a picture area which is discriminated as a picture. The character area sometimes contains color characters. When the image is separated into the character and picture areas, preferably the spatial filter processing section 27 performs a sharpness stressing process by which a high frequency is stressed and the halftone output gradation processing section 28 performs a high resolution dither process which is suitable in realizing high frequency to the character area to enhance the reproducibility of black or color characters within the image. As for the picture area, preferably the spatial filter processing section 27 performs a lowpass filtering process and the halftone output gradation processing section 28 performs the dither process stressing the reproducibility of the gradation to remove the network point component within the picture area.

Figure 3:
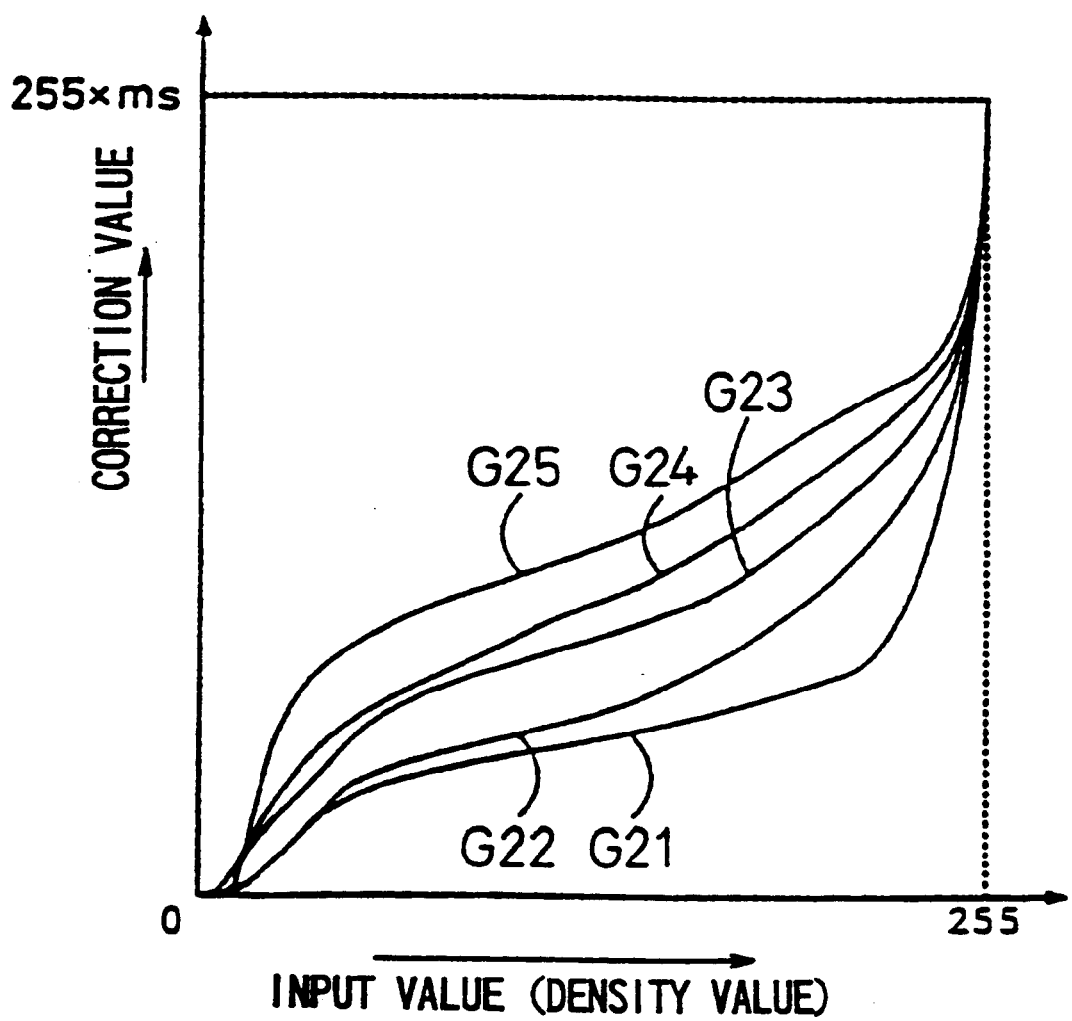
FIG. 3 is a graph showing a reference correction curve used in the inventive gradation correcting process.

The image processor 14 of the present embodiment is characterized in the gradation correcting process in the halftone output gradation processing section 28. The gradation correcting process is executed in accordance to the following procedure in outline. Reference correction curves as shown in FIG. 3 are stored in advance in the curve storing section 31 and a plurality of correction amounts are set and stored in advance in the correction amount storing section 32 for the gradation correcting process. The halftone output gradation processing section 28 creates a correction curve to be actually used by using the reference correction curves and the correction amounts at the point of time when CMYK image data is supplied and carries out the gradation correcting process by using the created correction curves. The halftone output gradation processing section 28 uses the created correction curves, not the reference correction curves, as described above because the output characteristics intrinsic to the image output unit 15 vary depending on the production.

The reference correction curves become the base in deciding to what kind of value the value outputted corresponding to the density value of the inputted image data should be corrected in the halftone output gradation processing section 28. The reference correction curves and the created correction curves both indicate changes of correction value with respect to the inputted density value. The inputted density value is a density value inputted to the halftone output gradation processing section 28 and to be processed. The correction value is a value outputted from the halftone output gradation processing section 28 and corresponds to the density of a pixel. "The correction value on the reference correction curve" will be denoted as a "reference correction value" in the following explanation.

The correction amount corresponds to the specified density value in the ratio of 1-to-1. The specified density value is an input density value specified in advance while leaving intervals among each other within the range of the inputted density values. A correction amount corresponding to a certain specified density value is a difference between a correction value to the specified density value on the correction curve actually used in the gradation correcting process and a correction value on the reference correction curve to the specified density value. The correction amount is set based on the reference correction curve corresponding to the specified density value. A number of specified density values is smaller than a total number of possible values of the inputted density values to reduce an amount of data concerning to the gradation correcting process. The specified density values is 16 in the present embodiment.

The gradation correcting process of the present embodiment is further characterized in the correction curve creating process. The procedure for creating the correction curve will be explained below in outline by using a graph of the reference correction curve GYB in FIG. 4. In creating the correction curve GYP, the halftone output gradation processing section 28 calculates a correction value $YP(XP_i)$ on the correction curve with respect to the specified density value $XP_i$ by adding the reference correction value $YB(XP_i)$ and a correction amount $w_i$ corresponding to the specified density value $XP_i$ with respect to an arbitrary integer i which is more than 1 and which is less than the total number of the specified density values. It is noted that the correction amount $w_i$ is a minus value in FIG. 4.

Next, the halftone output gradation processing section 28 calculates a correction value on the correction curve GYP for the inputted density values other than the specified density value $XP_i$ by means of interpolation operation. This interpolation operation is carried out so that the shape of a part $G3_i$ of the correction curve existing within a section $\Delta XP_i$ whose both ends are the specified density values $XP_i$ and $XP_{i+1}$ coincides with the shape obtained by extending or compressing a part $G4_i$ of the reference correction curve GYB within the section $\Delta YB_i$ whose both ends are the correction values $YP(XP_i)$ and $YP(XP_{i+1})$ on the correction curve to the specified density values $XP_i$ and $XP_{i+1}$ in the direction X parallel to the axis of the density value with respect to the arbitrary integer, which is more than 1 and less than the total number of the specified density values. Because the range of the inputted density values is divided into the number of the sections $\Delta XP_i$ which is less than the number of the whole specified density values by 1, the correction curve GYP may be obtained by carrying out the above-mentioned process per each section $\Delta XP_i$ whose both ends are the specified density values.

The "section whose both ends are the specified density values" will be called as the "first section" and the "section whose both ends are the correction values on the correction curve to the specified density values at the both ends of the first section" will be called as the "second section" in the following explanation. The inventive characteristic interpolation process, i.e., the interpolation process carried out so that the shape of the part of the curve to be created coincides with the shape obtained by extending or compressing the part of the reference correction curve in the direction X parallel with the axis of density will be called as an "analogous interpolation process" hereinafter. It is noted that the direction X parallel to the axis of the density value corresponds to the horizontal direction in the graph of the correction curve.

Preferably, the reference correction curve and a set of correction amounts are set respectively per each color component of CMYK. In this case, the halftone output gradation processing section 28 uses the reference correction curve and the correction amounts set per each color component in performing the gradation correcting process to the density value of each color component. Thereby, the halftone output gradation processing section 28 can carry out the gradation correcting process adequately per each color component.

The gradation correcting process of the present embodiment will be explained below in detail. It is noted that the following explanation describes a case when the halftone generating process is realized by the dither process and the gradation correcting process is a part of the dither process. Therefore, the halftone output gradation processing section 28 serves as gradation correcting process means for carrying out the gradation correcting process and halftone generating process means for carrying out the halftone generating process. It is noted that the gradation correcting process to the density values of the colors CMYK is the same except that the concrete values of the reference correction curve and the correction amounts to be used are different from each other, only the gradation correcting process to the density value of one arbitrary color will be explained in the following explanation. In the present embodiment, the inputted density value is an integer within a range more than 0 and less than 255 and the correction value is an integer within the range more than 0 and less than image signal times of 255. "ms" is the size of dither matrix used in the dither process. The reason why the range of the correction value is more than 0 and less than 255×image signal is because the gradation correcting process is also the dither process.

It is preferable to set a plurality of curves as the reference correction curves of one color. In this case, the halftone output gradation processing section 28 selects and uses one optimal reference correction curve among the plurality of reference correction curves based on the output characteristics intrinsic to the image output unit 15.

The halftone output gradation processing section 28 is provided with a plurality of reference characteristic curves and data of test images in advance to select the reference correction curve.

Figure 5:
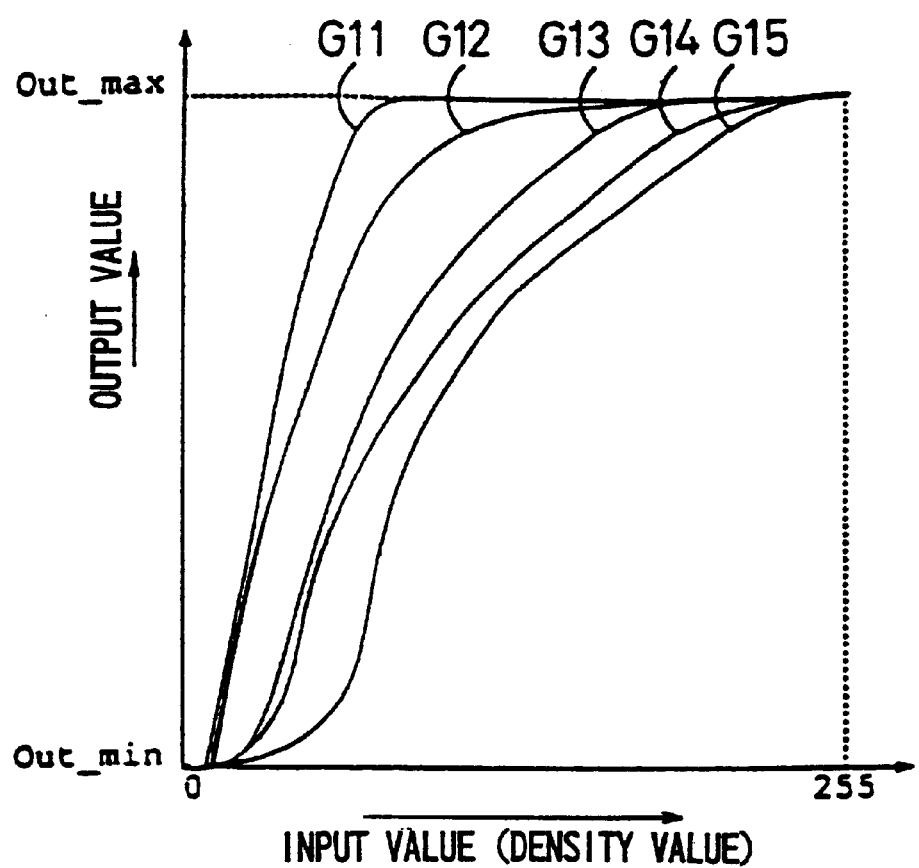
FIG. 5 is a graph showing reference characteristic curves used for selecting a reference correction curve necessary for the inventive gradation correcting process.

For instance, when the five reference correction curves G21 through G25 shown in FIG. 3 are stored in the curve storing section 31, reference characteristic curves G11 through G15 representing five input and output characteristics as shown in FIG. 5 are given. The input/output characteristics of the reference characteristic curves is the characteristics in the state when no gradation correcting process is performed on the unit (hereinafter called as a "gradation correcting and outputting system") composed of the halftone output gradation processing section 28 and the image output unit 15 and corresponds to changes of the input density values corresponding to the density of pixel of the image printed by the image output unit 15. Because the density of pixel of the printed image is measured by using the image input unit 13 as described later, the output value of the image input unit 13 is used as the value corresponding to the density of pixel of the printed image.

The reference correction curve corresponds to the reference characteristic curve in the relationship of 1 to 1. In FIGS. 3 and 5, the reference characteristic curve G11 corresponds to the reference correction curve G21. In the same manner, the curves whose last reference numerical values are equal correspond to each other. The greater the gradient of the reference characteristic curve, the smaller the gradient of the corresponding reference correction curve is. When the graph of the input/output characteristics of the gradation correction output system coincides with a certain reference characteristic curve, the graph of the input/output characteristics of the gradation correction output system coincides with a predetermined target characteristic curve by carrying out the gradation correcting process by using the reference correction curve corresponding to that reference characteristic curve.

Figure 6:
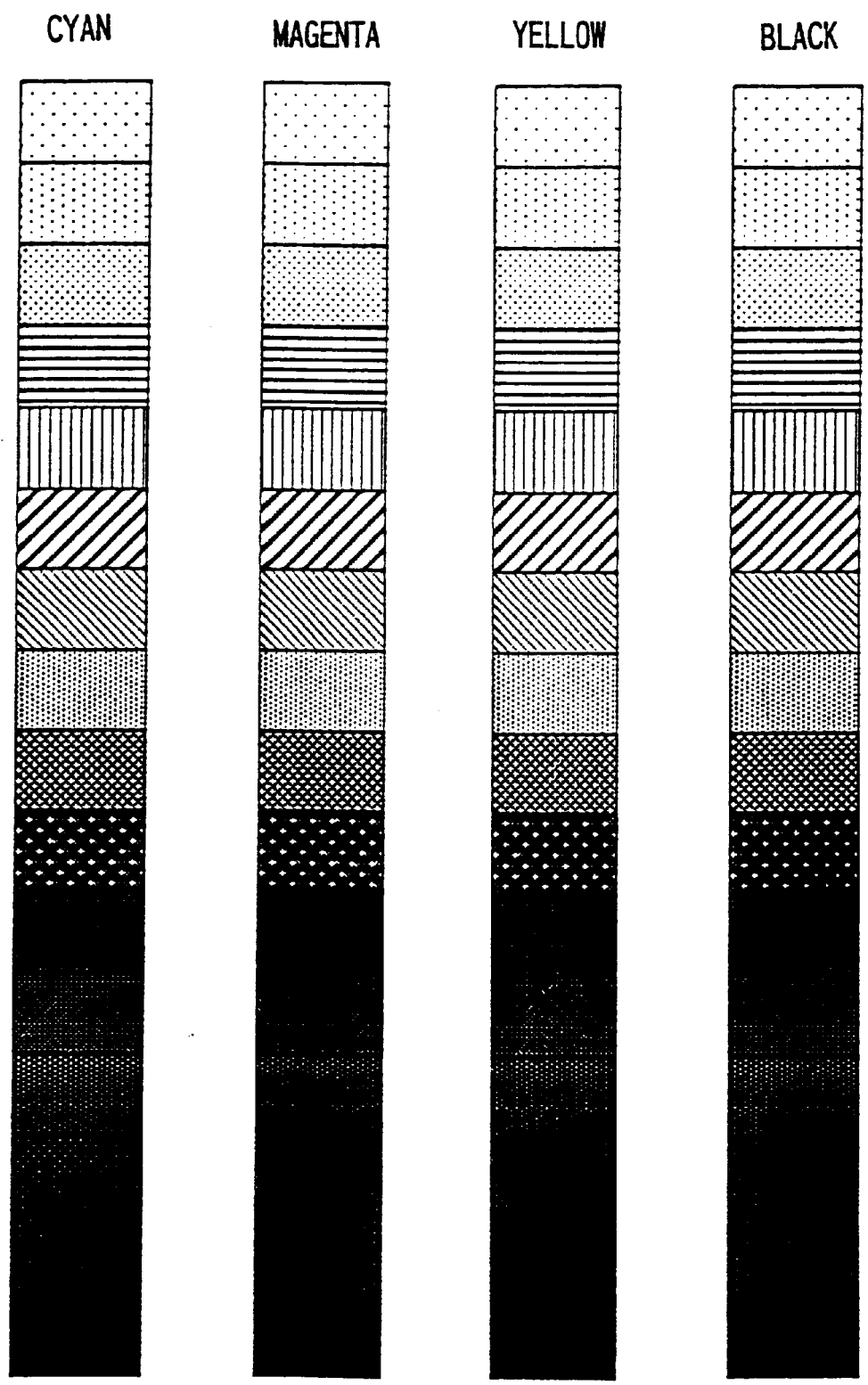
FIG. 6 is a chart showing test images used in the inventive gradation correcting process.

A test image is composed of image patterns of density corresponding respectively to a plurality of specified density values per each color of CMYK, for example, as shown in FIG. 6. Such image pattern is called as a patch.

Figure 7:
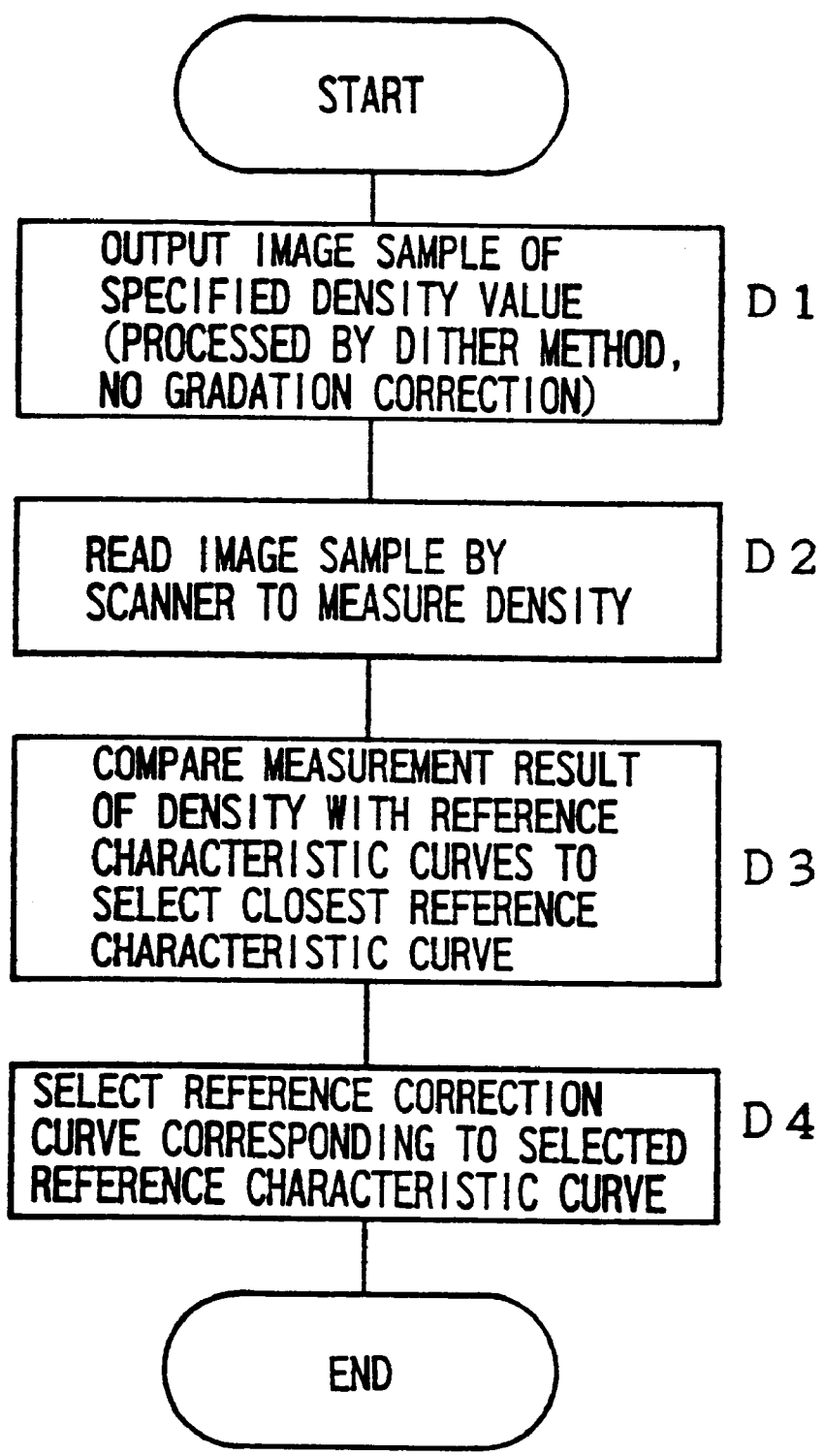
FIG. 7 is a flowchart showing a process for selecting the reference correction curve.

FIG. 7 is a flowchart showing a process for selecting the reference correction curve. The procedure for selecting the reference correction curve will be explained below by using FIGS. 7, 3, 5, 8 and 9. In Step D1, the halftone output gradation processing section 28 performs only the halftone generating process to the test image without performing the gradation correcting process and the image output unit 15 outputs the test image after the halftone generating process. Thereby, the test image (image sample) to which no gradation correcting process has been performed is printed on a recording sheet (paper P). In Step D2, the halftone output gradation processing section 28 causes the image input unit 13 to read the printed test image (image sample) to obtain an output value (hereinafter referred to as an "output measurement value") corresponding to the density of each patch of the printed test image. The output measurement value of each patch is correlated with the specified density value of each patch. It allows the output characteristics intrinsic to the image output apparatus to be obtained.

Figure 8:
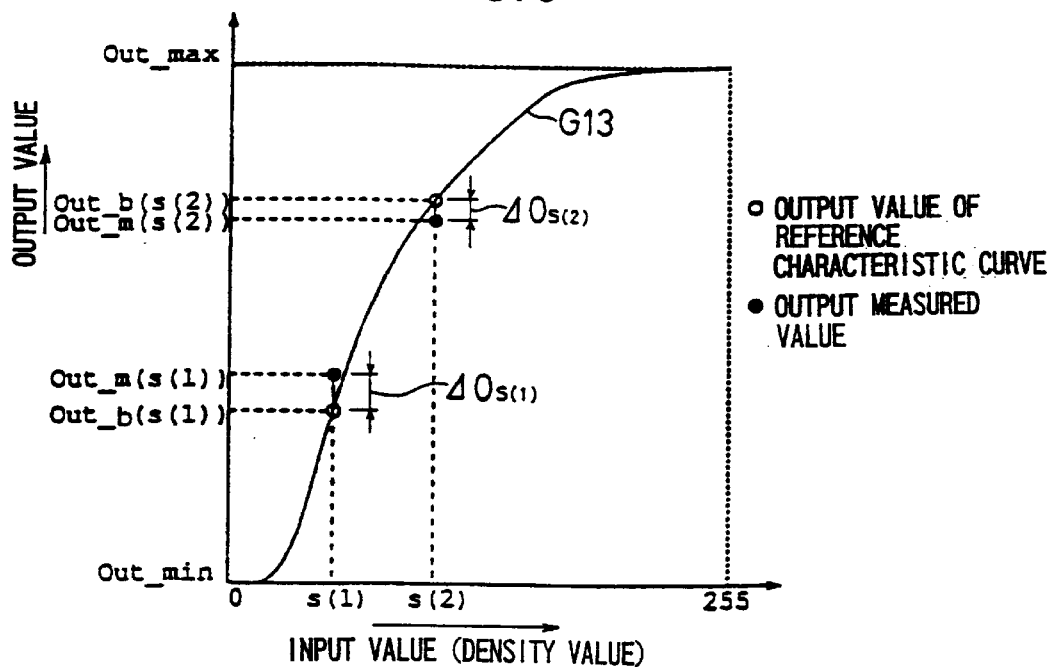
FIG. 8 is a graph for explaining a method for finding the difference between an output measurement value corresponding to a specified density value and the reference characteristic curve in selecting the reference characteristic curve.
Figure 9:
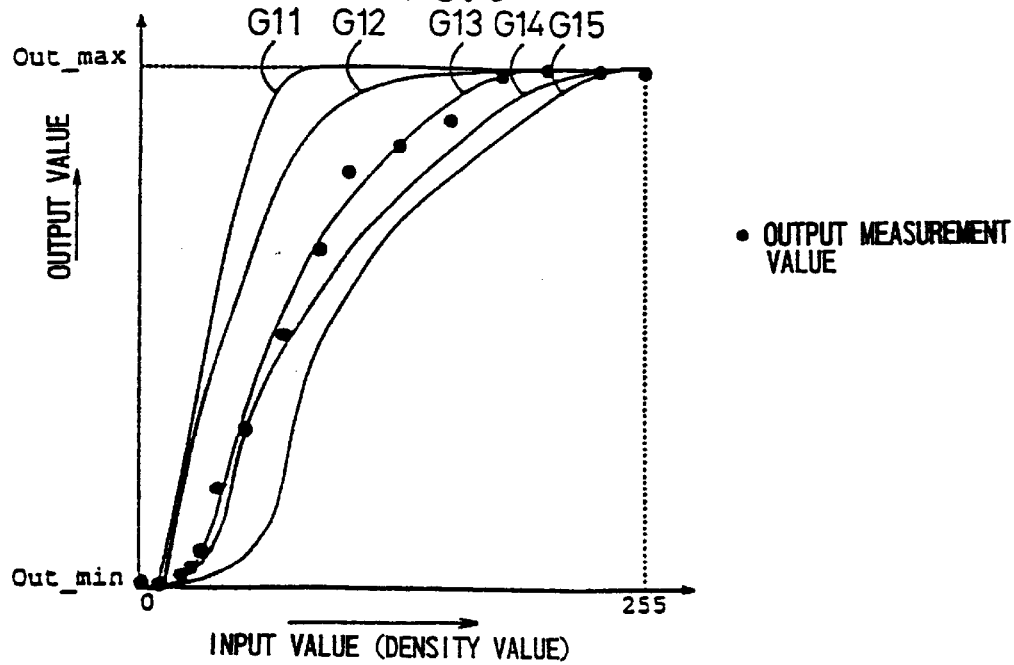
FIG. 9 is a graph for explaining a method for selecting the closest reference correction curve by comparing the output measurement value corresponding to the specified density value and the reference characteristic curve.

In Step D3, the halftone output gradation processing section 28 compares the output measurement value with each reference characteristic curve to discriminate which reference characteristic curve is closest to the output measurement value. To that end, the halftone output gradation processing section 28 finds the difference between the output measurement value and each reference characteristic curve. FIG. 8 shows a case in finding the difference between the third reference correction curve G13 and the output measurement value corresponding to arbitrary specified density values s(1) and s(2). In the case of FIG. 8, the difference $\Delta O_{s(1)}$ between the output measurement value OUT-m(s(1)) corresponding to the specified density value s(1) and an output value OUT-b(s(1)) on the reference characteristic curve G13 corresponding to the specified density value s(1) is found as for the specified density value s(1). In the same manner, the difference $\Delta O_{s(2)}$ between the output measurement value OUT-m(s(2)) corresponding to the specified density value s(2) and an output value OUT-b(s(2)) on the reference characteristic curve G13 corresponding to the specified density value s(2) is found as for the specified density value s(2). After finding the difference between each reference characteristic curve and the output measurement value for all of 16 specified density values, the halftone output gradation processing section 28 discriminates one reference characteristic curve closest to the distribution of the output measurement value by using the found differences.

In Step D4, the halftone output gradation processing section 28 selects the reference correction curve corresponding to the reference characteristic curve discriminated as closest to the output measurement value and ends the process. When the output measurement values corresponding to the 16 specified density values are represented by black dots in FIG. 9, it is apparent that the third reference characteristic curve G13 is closest to the output measurement value based on the weighted sum of the differences or variance of the differences for example and the third reference correction curve G23 (FIG. 3) corresponding to the reference characteristic curve G13 is selected. When the reference correction curve selected based on the output characteristics intrinsic to the image output unit 15 is used in creating the correction curve, the halftone output gradation processing section 28 can create an adequate correction curve corresponding to the output characteristics intrinsic to the image output unit 15.

When the gradation correcting process is performed on the test image by using the selected reference correction curve as it is, the test image after the process is printed by the image output unit 15 and the printed test image is read, there is a case when the characteristics of the output measurement value for the input density value deviates from a predetermined target characteristic curve. In such a case, the correction amount corresponding to the specified density value is defined based on the output characteristics intrinsic to the image output unit 15. The correction amount defined based only on the output characteristics intrinsic to the image output unit 15 will be called as a "first correction amount" in the following explanation. The process for setting the first correction amount is carried out by the halftone output gradation processing section 28. When the process for selecting the reference correction curve has been carried out, the process for setting the first correction amount is carried out in continuation to the process for selecting the reference correction curve.

The process for setting the first correction amount based on the output characteristics intrinsic to the image output unit 15 will be explained below by using FIGS. 10 and 11. At first, the gradation correcting process and the halftone generating process are performed to the test image prepared in advance by using the reference correction curve as it is. Next, the test image after those two processes is printed on the recording sheet by the image output unit 15. Then, the image input unit 13 reads the printed test image. As a result, the output measurement value of the patch of each specified density value may be obtained. It is noted that because the patch is composed of a plurality of pixels, preferably the image input unit 13 outputs the output measurement value of the pixel by reading the plurality of respective pixels composing the patch and the halftone output gradation processing section 28 calculates an average value of the output measurement values of the plurality of pixels composing the patch to set the average value as the output measurement value of the patch. The output measurement value of the patch thus obtained is correlated with the specified density value of the patch in the relationship of 1 to 1. A black dot P1 is a point representing the output measurement value $YM_i$ corresponding to the i-th specified density value $XP_i$ in FIG. 10.

Figure 10:
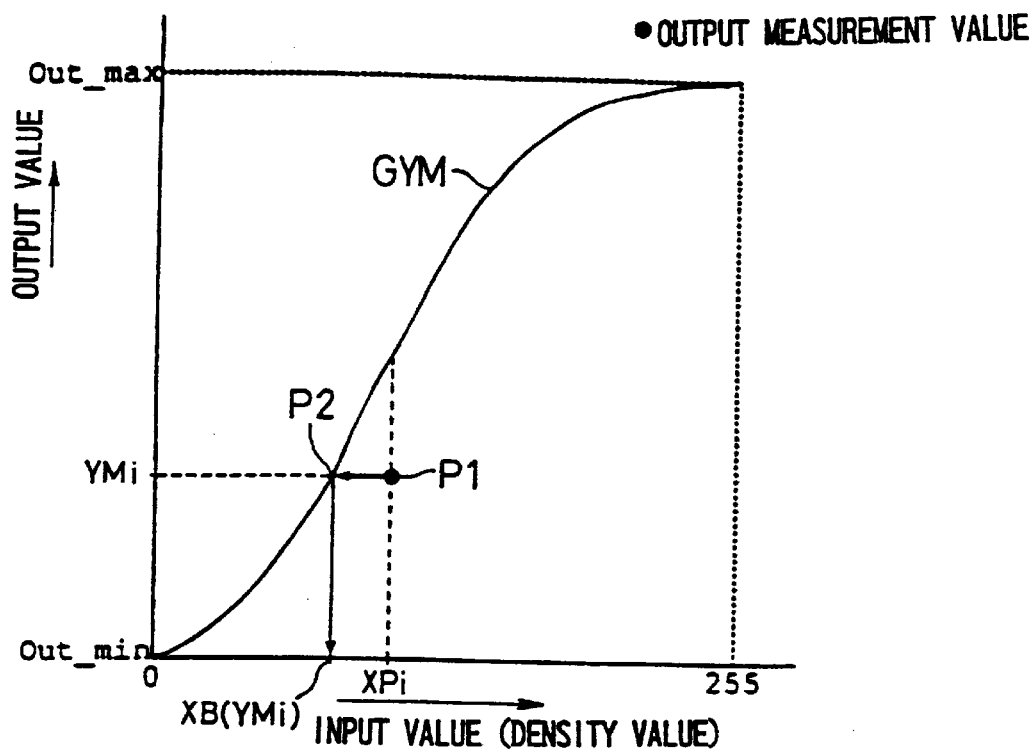
FIG. 10 is a graph for explaining a method for finding an input density value on a target characteristic curve with respective to an output measurement value.

Next, the halftone output gradation processing section 28 compares the target characteristic curve GYM read from the target characteristic curve storing section (target characteristic curve storing means) 33 with the output measurement value $YM_i$ corresponding to the specified density value $XP_i$ to find an input density value $XB(YM_i)$ on the target characteristic curve GYM corresponding to the output measurement value $YM_i$ as shown in FIG. 10. It is noted that the "input density value on the target characteristic curve corresponding to the output measurement value" will be called as an "output target density value" in the following explanation. Next, the reference correction value $YB(XP_i)$ to the specified density value $XP_i$ is substituted as a value $V(YM_i)$ on an imaginary curve to the output target density value $XB(YM_i)$ as shown in FIG. 11. The value on the imaginary curve is a correction value on the correction curve to be used by the halftone output gradation processing section 28 to output the image corresponding to the target characteristic curve GYM and the correction curve corresponds to a correction curve obtained by correcting the reference correction curve by using only the first correction amount.

The process for setting a value on an imaginary curve is executed to each of the plurality of output measurement values. Thus, the value $V(YM_i)$ on the imaginary curve to the output target density value $XB(YM_i)$ which is the input density value other than the specified density value $XP_i$ is found based on the output measurement value $YM_i$ deviated from the target characteristic curve. After setting the value on the imaginary curve to the output target density value, the halftone output gradation processing section 28 finds the value on the imaginary curve to the specified density value by the interpolation process using the value on the imaginary curve thus set.

After finishing the interpolation process, the halftone output gradation processing section 28 finds the difference between each specified density value $XP_i$ and the value $V(XP_i)$ on the imaginary curve and each specified density value $XP_i$ and the reference correction value $YB(XP_i)$. The difference thus found is used as the first correction amount $s_i$ corresponding to the specified density value $XP_i$. For instance, when the changes of the value on the imaginary curve to the input density value are represented by a curve GV in FIG. 11, the first correction amount $s_i$ corresponding to the i-th specified density value $XP_i$ is the difference between the reference correction value $YB(XP_i)$ to the specified density value $XP_i$ and the value $V(XP_i)$ on the curve GV. When the correction amount $w_i$ for creating the correction curve is set based only on the output characteristics intrinsic to the image output unit 15, the first correction amount $s_i$ is stored in the correction amount storing section 32 as it is as the correction amount $w_i$ to the specified density value. The use of the procedure described above allows the halftone output gradation processing section 28 to set the first correction amount adequately based on the output characteristics intrinsic to the image output unit 15.

As described above, the data of the test image is stored in the storing section (memory) not shown in advance for the processes for selecting the reference correction curve and for setting the first correction amount. The test image printed on a recording sheet may be prepared in advance instead of preparing the data of the test image. In this case, prior to the execution of the process for selecting the reference correction curve or the process for setting the first correction amount, the halftone output gradation processing section 28 causes the image input unit 13 to read the printed test image and uses image signals created as a result as the data of the test image. The case of preparing the data of the test image is preferable as compared to the case of preparing the printed test image because the former case is not influenced by a reading error of the image input unit 13 and the like.

In the image forming apparatus 11 provided with the image processor 14 of the present embodiment, there is a case when the user wants to add desired density or contrast to the image outputted by the image output unit 15. In this case, the user sets an amount of adjustment corresponding to the density or contrast to be added and inputs it to the halftone output gradation processing section 28 from the control panel 16. The control panel 16 is used as means for inputting the adjustment amount. When the adjustment amount is inputted, the halftone output gradation processing section 28 finds a correction amount (hereinafter referred to as a "second correction amount") defined based on the adjustment amount and carries out the gradation correcting process by adopting the sum of the first correction amount and the second correction amount as a correction amount corresponding to the specified density value.

TABLE 1

|  | Specified Value of Density | | |
| --- | --- | --- | --- |
|  | 1 | 2 ... | N |
| Correction Amount Based on Output Characteristic | $s_1$ | $s_2$ ... | $s_n$ |
| Correction Amount Based on First Regulation Amount | $t_1$ | $t_2$ ... | $t_n$ |
| Correction Amount Based on Second Regulation Amount | $u_1$ | $u_2$ ... | $u_n$ |
| Correction Amount Based on Third Regulation Amount | $v_1$ | $v_2$ ... | $v_n$ |

$w_i = s_i + t_i + u_i + v_i$
$(i = 1, 2, \ldots, N)$ ... (1)

When a plurality of adjustment amounts are to be inputted, the halftone output gradation processing section 28 sets the total sum of the correction amounts each defined based on the respective adjustment amounts as the second correction amount. For instance, when three adjustment amounts are set as shown in Table 1, a correction amount $w_i$ corresponding to a certain specified density value is the sum of the first correction amount $s_i$ corresponding to the specified density value, a correction amount $t_i$ corresponding to the specified density value defined based on the first adjustment amount, a correction amount $u_i$ corresponding to the specified density value defined based on the second adjustment amount and a correction amount $v_i$ corresponding to the specified density value defined based on the third adjustment amount as represented by the equation (1). Thereby, when the various adjustment amounts are set, the second correction amount based on the adjustment amounts may be readily calculated.

FIG. 12 is a flowchart showing the main control process of the halftone output gradation processing section 28 within the image forming apparatus 11 in copying an original. It is noted that because the processes for selecting the reference correction curve and for setting the correction amount have been carried out prior to the specification of the copy of the original, one reference correction curve has been already selected and the correction amount has been stored in the correction amount storing section 32.

When the user inputs the specification of the copy of the original through the control panel 16, the halftone output gradation processing section 28 creates a correction curve based on the selected reference correction curve within the curve storing section 31 and a set of correction amounts within the correction amount storing section 32 and creates a γ correction table based on the created correction curve in Step A2. The γ correction table is a correction table per each pixel within the dither matrix created based on the prepared correction curve. The process in Step A2 will be described later in detail.

After creating the γ correction table, the halftone output gradation processing section 28 reads the input density value composing the data of the image to be processed from the spatial filter processing section 27 in Step A3. Then, the halftone output gradation processing section 28 carries out a γ correction process using the γ correction table corresponding to any one of the pixels within the dither matrix with respect to the read input density value in Step A4. Thereby, the read input density value is replaced by a value of the correction table corresponding to the input density value and the value of gradation of each pixel is set as a result.

The halftone output gradation processing section 28 judges whether all input density values composing the image data to be processed have been read or not in Step A5. When there remain input density values not read yet, the process returns from Step A5 to Step A3. The halftone output gradation processing section 28 ends the main control process when all of the processed density values of the image data have been read.

As described above in FIG. 12, the halftone output gradation processing section 28 creates the correction curve to be used for the gradation correcting process in copying the original by using the reference correction curve and the set of correction amounts. The shape of the correction curve to be created changes corresponding to the correction amounts. Therefore, preferably the image processor 14 is constructed so that the correction amount storing section 32 stores a plurality of sets of correction amounts and the halftone output gradation processing section 28 selects any one set of correction amounts to use in creating the correction curve in copying the original. Thereby, the halftone output gradation processing section 28 can carry out the gradation correcting process corresponding respectively to the plurality of target characteristic curves. At this time, because one set of correction amounts is composed of 16 values for example, a data amount of one set of correction amounts is smaller than a data amount of one correction curve. That is, the correction amount storing section 32 will do if it stores the sets of the correction amounts which is data of a predetermined limited amount in the process. Therefore, the storage capacity necessary for storing the reference correction curve and the plurality of sets of correction amounts is smaller than the storage capacity necessary for storing the correction curves corresponding respectively to the plurality of target characteristic curves.

When the correction amount corresponding to the specified density value is the first correction amount based on the output characteristics intrinsic to the image output unit 15, the halftone output gradation processing section 28 can carry out the adequate γ correction process based on the output characteristics intrinsic to the image output unit 15 substantially as the gradation correcting process. When the correction amount corresponding to the specified density value is the sum of the first correction amount and the second correction amount based on the adjustment amount, the halftone output gradation processing section 28 can carry out the process for correcting the density value based on the adjustment amount and the γ correction process based on the output characteristics intrinsic to the image output unit 15 substantially as the gradation correcting process. The correction amount corresponding to the specified density value may be only the second correction amount. In this case, the halftone output gradation processing section 28 can carry out the process for correcting the correction value based on the adjustment amount and the γ correction process using the reference correction curve substantially as the gradation correcting process. Further, when the correction amount corresponding to the specified density value is only the second correction amount, an adjustment amount corresponding to the output characteristics intrinsic to the image output unit 15 may be supplied to the image processor 14 instead of the adjustment amount related to the correction of the density value. In this case, because the second correction amount is an amount corresponding to the output characteristics intrinsic to the image output unit 15, the halftone output gradation processing section 28 can carry out the 7 correction process based on the output characteristics intrinsic to the image output unit 15 as the gradation correcting process.

Because the correction amount has been found in connection only to the specified density value as described above in the process of Step A2 in FIG. 12, it is difficult to find a correction value to the remaining input density values other than the specified density value by the same procedure as in the case of the correction amount to the specified density value in creating the correction curve. Therefore, a value obtained by interpolating a correction amount to the specified density value is used as explained in FIG. 13 as the correction value to the remaining input density value.

Figure 13:
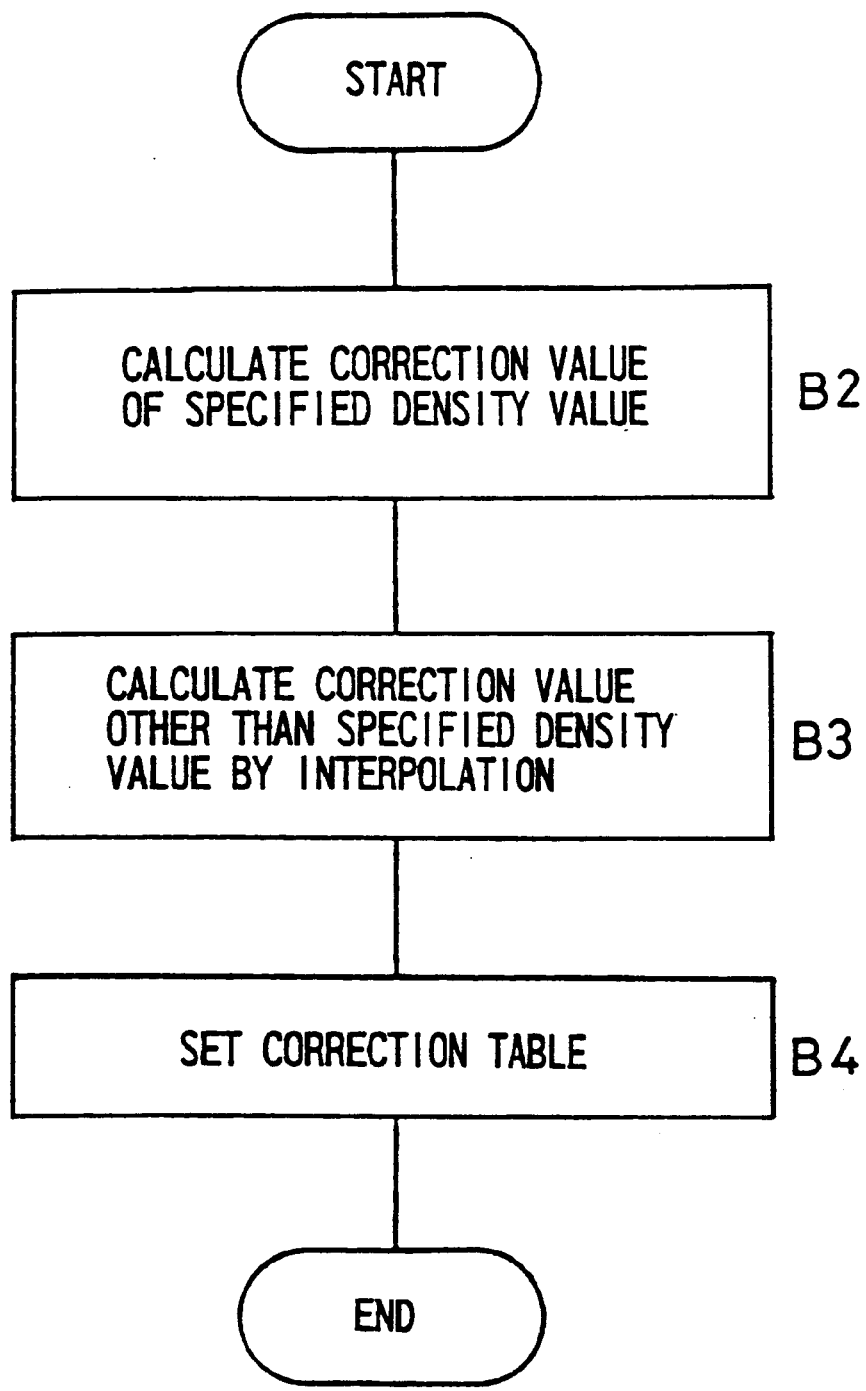
FIG. 13 is a flowchart showing a method for creating a γ correction table used in the inventive gradation correcting process.

FIG. 13 is a flowchart showing the procedure of the process of Step A2 of the main control process of the halftone output gradation processing section 28 in FIG. 12. When the user inputs a specification to copy the original through the control panel 16, the process advances to Step B2. The halftone output gradation processing section 28 finds the sum of the correction value on the reference correction curve to the specified density value and the correction amount corresponding to the specified density value in Step B2 and sets the obtained sum as a correction value to the specified density value. The halftone output gradation processing section 28 finds the correction amount to the remaining input density value other than the specified density value by the analogous interpolation process in FIG. 4 by using the correction amount to the specified density value in Step B3. The detail of the analogous interpolation process will be described later. Thus, the correction curve to be actually used in the gradation correcting process is created by the processes in Steps B2 and B3. The halftone output gradation processing section 28 creates the γ correction table based on the created correction curve in Step B4 and then ends the process.

Thus, the halftone output gradation processing section 28 can create the correction curve by the process explained in connection with FIG. 13. When the correction amount corresponding to the specified density value is the sum of the first correction amount and the second correction amount, the storage capacity necessary for storing the data for the gradation correcting process may be reduced further by creating the correction curve by the procedure explained in FIG. 13.

Figure 14:
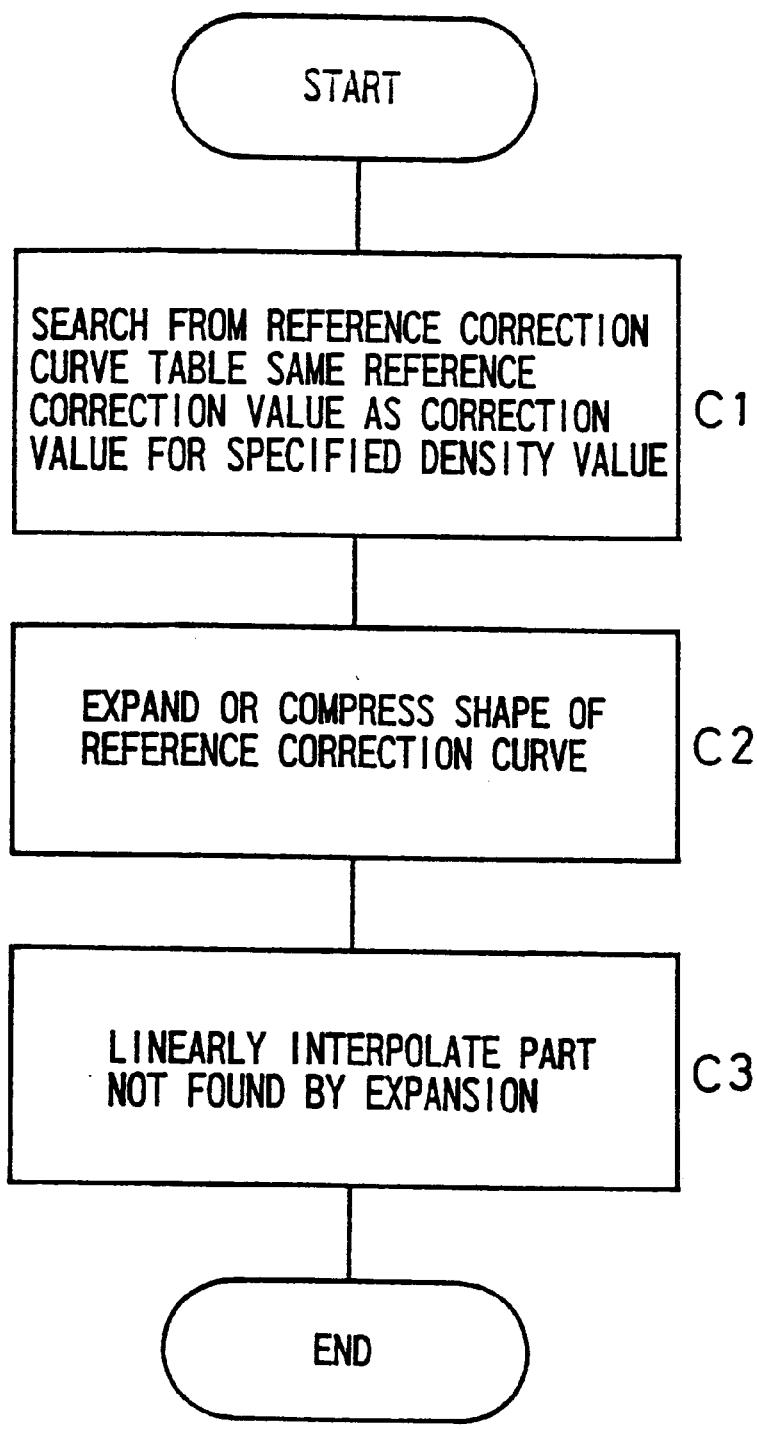
FIG. 14 is a flowchart showing a process for interpolating the correction curve used in creating the γ correction table.

FIG. 14 is a flowchart showing the analogous correction process carried out in Step B3 in FIG. 13. FIG. 15 is a chart showing a part of the reference correction curve and a part of the correction curve for explaining the analogous correction process in detail. The analogous interpolating process carried out in creating the correction curve will be explained by using FIGS. 14, 15 and 4.

The curve storing section 31 also stores a table of inverse function of the reference correction curve for the analogous interpolating process besides the table of the reference correction curve. The halftone output gradation processing section 28 is also provided with a storing section (not shown) for storing a table of correction values on the correction curve to the specified density value.

The halftone output gradation processing section 28 calculates the input density value $XB(YB_i)$ on the reference correction curve to the reference correction value $YB_i$ which is equal to the correction value $YP(XP_i)$ for each specified density value by using the table of inverse function of the reference correction curve in Step C1. A section $\Delta XB_i$ having the both ends of input density values $XB(YB_i)$ and $XB(YB_{i+1})$ on the reference correction curve to the reference correction values which are equal to the correction values to the specified density values $XP_i$ and $XP_{i+1}$ at the both ends of the first section will be called as a "third section" hereinbelow. A part within the second section $\Delta YB_i$ of the reference correction curve is the same as a part within the third section $\Delta XB_i$ of the reference correction curve.

The halftone output gradation processing section 28 moves the part within the third section of the reference correction curve to the first section in parallel with the horizontal direction X per third section to compress or expand the part within the third section of the reference correction curve in Step C2. In concrete, the halftone output gradation processing section 28 converts the input density value $J_i$ within the third section $\Delta XB_i$ by using the equation (2) at first. The input density value $J_i$ to be converted is defined by the equation (3). The ratio of the width of the first section $XP_{i+1}-XP_i$ to the width of the third section $XB(YB_{i+1})-XB(YB_i)$ is multiplied with a distance $J_i-XB(YB_i)$ from the input density value at one smaller end of the third section to the input density value to be converted in the right side of the equation (2) and the obtained product is added with the specified density value $XP_i$ at one smaller end of the first section.

$$XX_0(J_i) = XP_i + \frac{\{XP_i + 1 - XP_i\} \times \{J_i - XB(YB_i)\}}{\{XB(YB_i + 1) - XB(YB_i)\}} \quad (2)$$

$$J_i = XB(YB_i)+1, XB(YB_i)+2, \ldots, XB(YB_{i+1})-1 \quad (3)$$

Exemplifying a part of the reference correction curve $G4_i$ shown in FIG. 15A, a curve as shown in FIG. 15B may be obtained by substituting the reference correction value $YB(J_i)$ for the input density value $J_i$ before the conversion to the correction value for the input density value by using the sum $XX_0(J_i)$ obtained by the equation (2) as the input density value as it is. It is noted that in FIGS. 15A through 15D, the first section $\Delta XP_i$ is wider than the third section $\Delta XB_i$ and the curve is extended. Although the sum $XX_0(J_i)$ is not always an integer value, the input density value is defined to be an integer.

Next, the sum $XX_0(J_i)$ is rounded as an integer value. Any one of round-up, round-down and rounding to the nearest whole number may be used in the process for rounding the sum and the sum is rounded to the nearest whole number in the present embodiment. The input density value $XX(J_i)$ within the first section equal to the rounded sum is correlated with the input density value $J_i$ within the third section. The above-mentioned process correlates the input density value $J_i$ within the third section with the input density value $XX(J_i)$ within the first section so that the input density values at the both ends of the third section $\Delta XB_i$ coincide with the specified density values at the both ends of the first section $\Delta XP_i$. The halftone output gradation processing section 28 substitutes the reference correction value $YB(J_i)$ for the input density value $J_i$ within the third section to the correction value for the input density value $XX(J_i)$ within the first section correlated with the input density value $J_i$ within the third section. It allows a curve as shown in FIG. 15C to be obtained.

When the curve is compressed, there is a case when a plurality of input density values within the third section $\Delta XB_i$ are correlated with a single input density value within the first section $\Delta XP_i$ as a result of rounding the sum $XX_0(J_i)$ of the equation (2) to the nearest whole number in the process in Step C2. In this case, the halftone output gradation processing section 28 selects the input density value calculated at last among the overlapping input density values within the third sections and substitutes the reference correction value to that input density value to the correction value $YP(XX(J_i))$ of the input density value within the first section. It allows the halftone output gradation processing section 28 to create the correction curve more quickly. The shape of the part within the first section of the correction curve thus created is gotten out of the shape more or less more than the shape of the part within the second section of the reference correction curve which is compressed in the horizontal direction.

The halftone output gradation processing section 28 substitutes the center value of the reference correction values to the respective overlapping input density values within the third section to the correction value $YP(XX(J_i))$ of the input density value within the first section. When there are an even number of overlapping input density values, an average value of the reference correction values to the center two input density values is used as the center value. It allows the halftone output gradation processing section 28 to find the correction value for the input density value within the first section not correlated with the input density value within the third section readily by interpolation operation, so that it can create the correction curve more suitably to the image output unit 15.

When the curve is extended, the correction value to the whole input density values within the first section cannot be obtained only by the processes in Steps C1 and C2. In the example of FIG. 15C, the interval W2 between two adjacent input density values on the axis of density among the input density values $XX(J_i)$ whose correction value has been calculated is not always 1 and there is a part where it is 2 or more.

The halftone output gradation processing section 28 selects input density values $XX(JJ)$ and $XX(JJ+1)$ whose interval W2 is greater than 1 as shown by the equation (4) among all input density values whose correction value has been calculated in Step C3 in order to calculate the correction value to the remaining input density values. Then, it calculates a correction value $YP(XX)$ to the remaining input density values existing within the section having the both ends of the selected input density values $XX(JJ)$ and $XX(JJ+1)$ by means of the interpolation operation using the correction values $YP(XX(JJ))$ and $YP(XX(JJ+1))$ to the selected input density values. Linear interpolation as shown by the equation (5) is used for the interpolation of the correction value in the present embodiment.

where, $$W2=XX(JJ+1)-XX(JJ)>1, JJ=XB(YB_i), XB(YB_i)+1, \ldots, XB(YB_{i+1})-1 \quad (4)$$

$$YP(XX) = YP(XX(JJ)) + \frac{\{(K - XX(JJ)) \times (YP(XX(JJ+1)) - YP(XX(JJ)))\}}{W2}$$

where, $$K=XX(JJ)+1, XX(JJ)+2, \ldots, XX(JJ)+W2-1 \quad (5)$$

The calculation of the equation (5) allows the correction value for the input density value represented by a thick auxiliary line to be obtained in the example of FIG. 15D. The thick line represents a case of finding the correction value by means of linear interpolation to integer values of one each in the section when the interval between the sections of the input density values $XX(J_i)$ and $XX(J_{i+1})$ whose correction values have been calculated is two or more in FIG. 15D. After calculating the correction values to all input density values by the above-mentioned processes, the process in the flowchart in FIG. 14 ends.

The process in FIG. 14 allows the halftone output gradation processing section 28 to calculate the correction value for the input density value within the first section based on the input density value within the third section and the correction value on the reference correction curve for the input density value. Still more, because the process for rounding the sum $XX_0(J_i)$ is carried out in the process of Step C2 as explained in FIG. 15, the halftone output gradation processing section 28 can calculate the correction value for the input density value within the first section based on the input density value within the third section and the correction value on the reference correction curve for the input density value even when a number of digits of the input density value is limited to be digits greater than the decimal point.

When the inventive analogous interpolation is used in the interpolation operation in creating the correction curve, the correction curve may be obtained quickly by relatively simple calculations as compared to the case of using the spline interpolation or the n-order function approximation for the interpolation operation. The output characteristics of the correction curve per first section is analogous to the output characteristics of the reference correction curve of the second section. Thereby, an output section whose output characteristic based on the reference correction curve is almost linear maintains the almost linear output characteristic even after when the correction is made based on the created correction curve.

Preferably, the specified density value contains the upper limit and lower limit density values within the range of the input density values as shown in FIG. 16 to reliably execute the interpolation operation in the low and high density parts in the range of the input density values in executing the interpolation operation using the analogous interpolation. According to the present embodiment, the upper limit density value is 255 and the lower limit density value is 0. When one of the specified density values is the lower limit density value, a correction value to an input density value which is smaller than the other specified density value than the lower limit density value is more suitable. When one of the specified density values is the upper limit density value, a correction value for the input density value which is greater than the other specified density value than the upper limit density value is more suitable. By these reasons, the halftone output gradation processing section 28 can execute the gradation correction more adequately.

Figure 17:
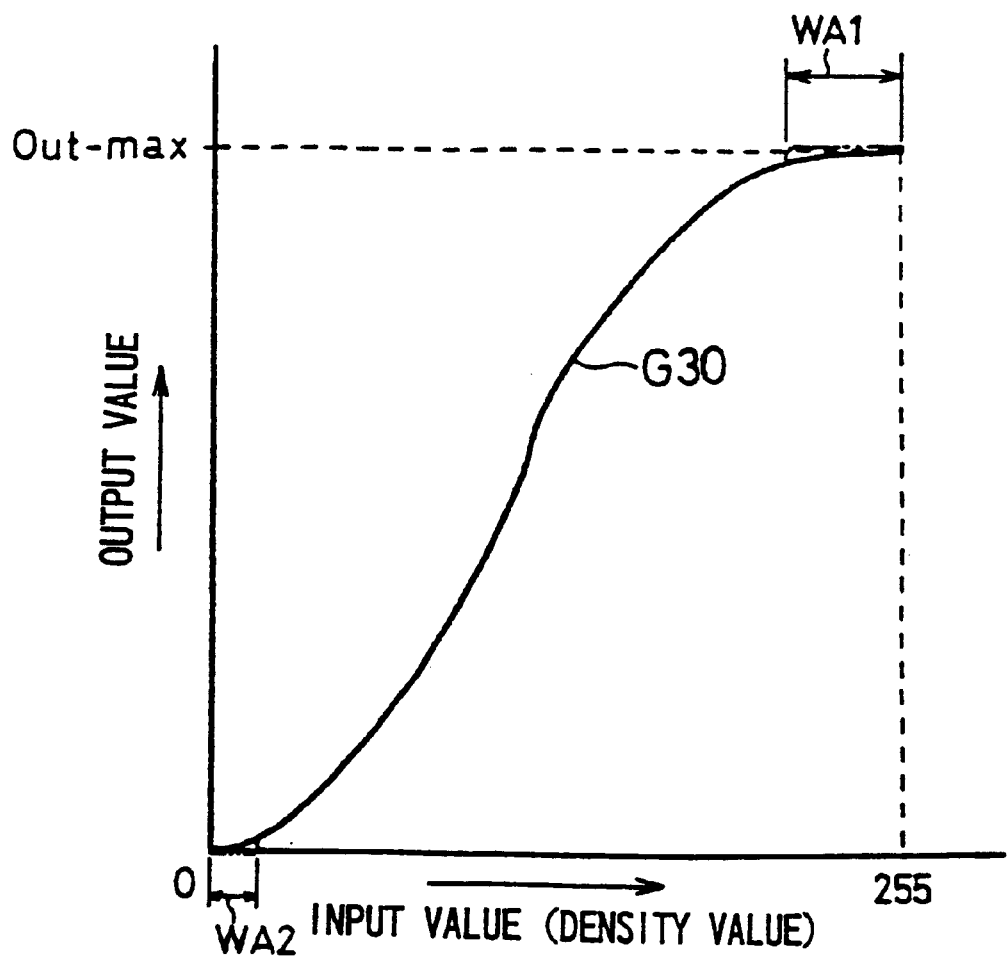
FIG. 17 is a graph for explaining a case of fixing correction values in the nearby section of the upper limit density value and the nearby section of the lower limit density value in the interpolation in FIG. 4.

Further, as shown in FIG. 17, there is a case of fixing the output characteristics in the nearby section WA1 of the upper limit density value where the density value is smaller than the upper limit density value and is greater than the first input density value and the nearby section WA2 of the lower limit density value where the density value is greater than the lower limit density value and is smaller than the second input density value. In this case, the halftone output gradation processing section 28 always substitutes a density value corresponding to a predetermined pixel density to the correction value to fix the correction value to the input density values within the sections WA1 and WA2 in creating the correction curve. Thereby, the output characteristics within the nearby section WA1 of the upper limit density value and the nearby section WA2 of the lower limit density value are maintained always to the predetermined characteristics in the created correction curve. In the example shown in FIG. 17, the saturation density is outputted to the input density value in the section WA1 and zero is outputted (not printed) to the input density value in the section WA2.

Figure 4:
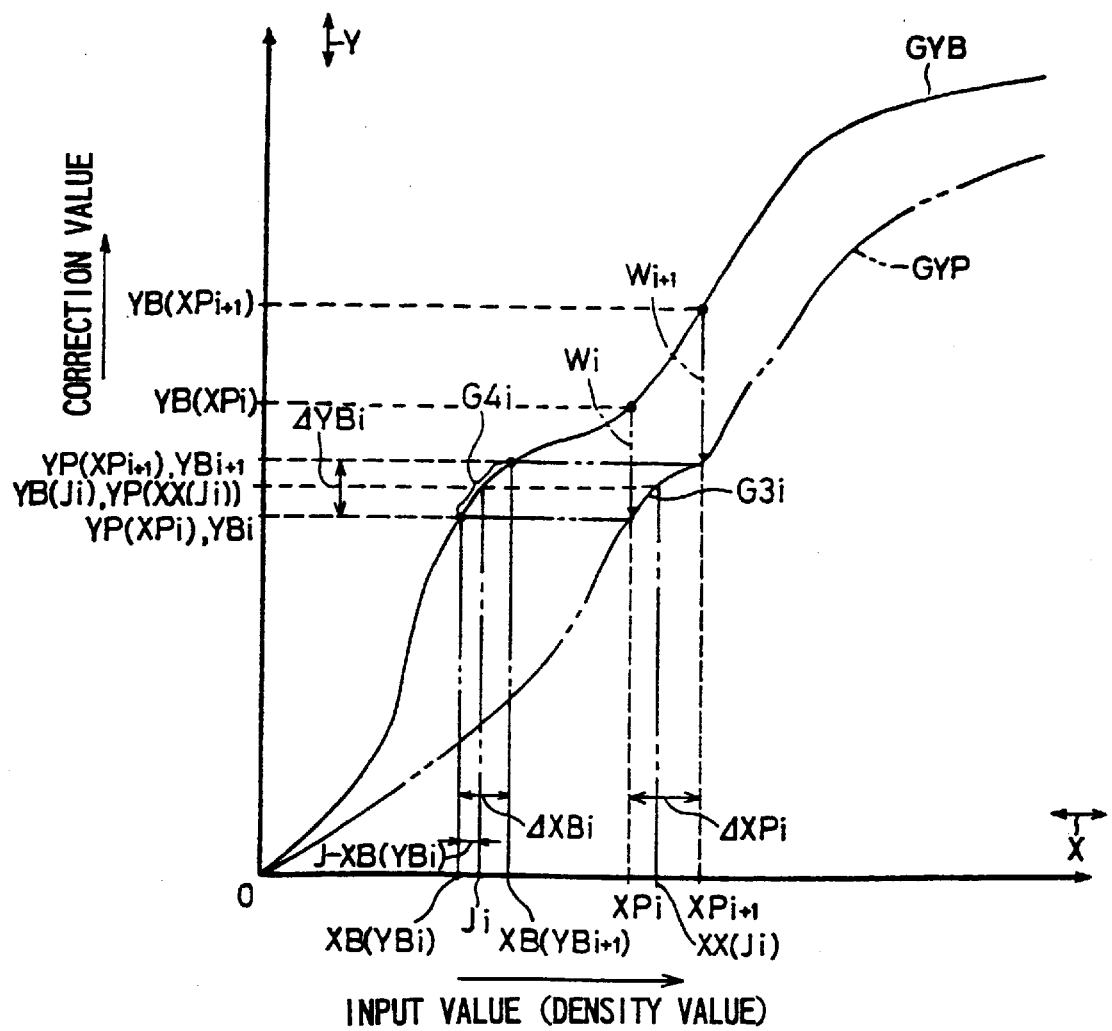
FIG. 4 is a graph of a correction curve for explaining a process for interpolating correction values in the invention.
Figure 11:
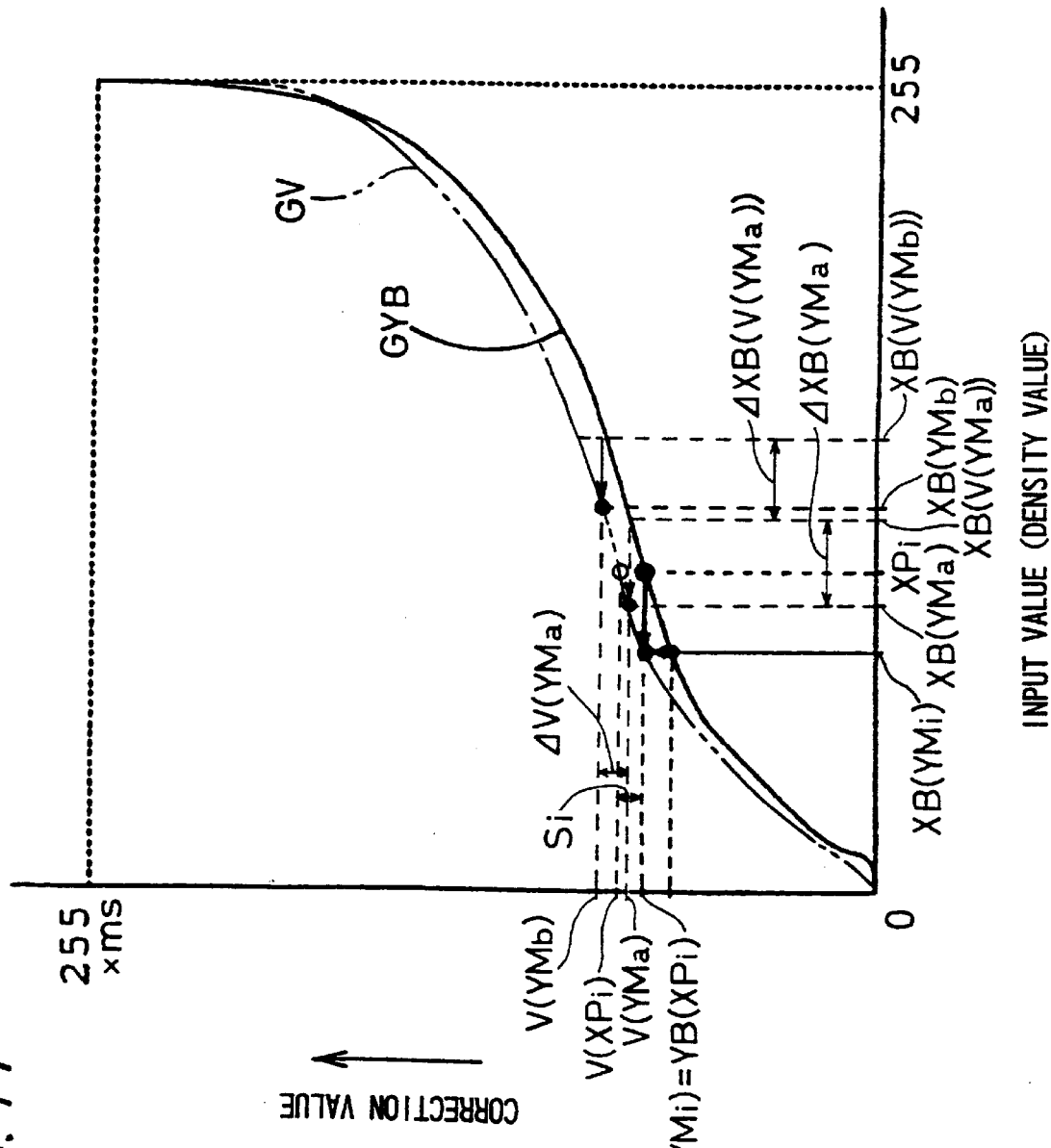
FIG. 11 is a graph for explaining a method for setting a correction value for the input density value on the target characteristic curve with respect to the output measurement value.
Figure 18:
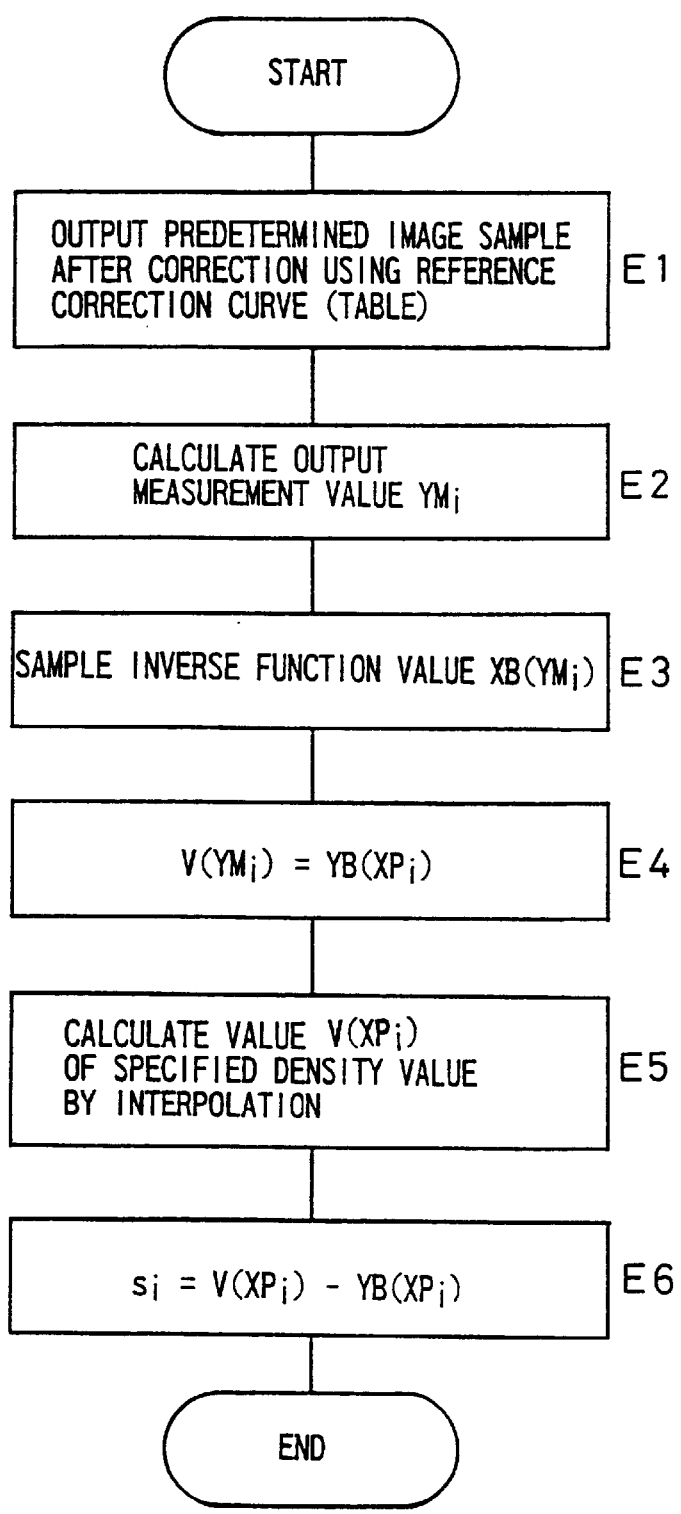
FIG. 18 is a flowchart showing a process for setting a first correction amount by using the interpolation in FIG. 4.

While any interpolation method may be used for the interpolating process of values on an imaginary curve in the process for calculating the first correction amount in FIGS. 10 and 11, it is most preferable to use the analogous interpolation process explained in FIG. 4. FIG. 18 is a flowchart for explaining the process for setting the first correction amount by using the analogous interpolation process. It is noted that in the explanation of FIG. 18, the subscript i is an arbitrary integer greater than 1 and smaller than the total number of the specified density values and the processes from Steps E1 through E4 are equal to the processes from printing of the test image to the value on the imaginary curve to the output target density value in the procedure for calculating the first correction amount $s_i$ explained by using FIGS. 10 and 11.

The contents of the process shown in FIG. 18 will be explained below by using FIG. 11. The halftone output gradation processing section 28 performs the gradation correcting process and the halftone correcting process using the reference correction curve as it is to the test image and causes the image output unit 15 to print the test image after those processes in Step E1. Then, the halftone output gradation processing section 28 causes the image input unit 13 to measure the density of the patch of each specified density value $XP_i$ of the printed test image to obtain an output measurement value $YM_i$ corresponding to each specified density value in Step E2. The halftone output gradation processing section 28 calculates the input density value on the target characteristic curve GYM to the output measurement value $YM_i$ corresponding to each specified density value, i.e., the output target density value $XB(YM_i)$, in Step E3. The halftone output gradation processing section 28 substitutes the reference correction value $YB(XP_i)$ to the specified density value $XP_i$ to the value $V(YM_i)$ on the imaginary curve to the calculated output target density value $XB(YM_i)$ as represented by the equation (6) in Step E4.

$$V(YM_i)=YB(XP_i) \quad (6)$$

The range of the input density value is divided into a number of sections which is less than the total number of the specified density values by one by the whole output target density values calculated based on each of the output measurement values corresponding to all specified density values. The section having the both ends of the output target density values $XB(YM_k)$ and $XB(YM_{k+1})$ will be called as a "fourth section $\Delta XB(YM_k)$" hereinafter. The subscript k is an arbitrary integer equal to or greater than 1 and less than the total number of the output target density values.

The halftone output gradation processing section 28 calculates the value $V(XP_i)$ on the imaginary curve to the specified density value $XP_i$ based on the analogous interpolation in Step E5. The analogous interpolation process in Step E5 is carried out so that the shape of the curve GV within the fourth section $\Delta XB(YM_a)$ coincides with the shape of a part of the reference correction curve within the section $\Delta V(YM_a)$ having the both ends of the values of curve $V(YM_a)$ and $V(YM_b)$ to the output target density values at the both ends of the fourth section. The "section having the both ends of the values of curve to the output target density values at the both ends of the fourth section" will be called as a "fifth section" in the following explanation.

To this end, the halftone output gradation processing section 28 selects the output target density value $XB(YM_a)$ closest to the specified density value $XP_i$ among those less than the specified density value $XP_i$ within the whole curve density values and the output target density value $XB(YM_b)$ closest to the specified density value $XP_i$ among those more than the i-th specified density value $XP_i$ within the whole curve density values. Then, it finds input density values $XB(V(YM_a))$ and $XB(V(YM_b))$ on the reference correction curve GYB to the reference correction values equal respectively to the values of curve $V(YM_a)$ and $V(YM_b)$ to the selected output target density values. The "input density value on the reference correction curve to the reference correction value equal to the value on the imaginary curve to the output target density value" will be called as a "curve density value" in the following explanation.

Next, the halftone output gradation processing section 28 calculates the value $V(XP_i)$ on the imaginary curve to the specified density value $XP_i$ by using the equation (7). The right side of the equation (7) represents the reference correction value to the input density value equal to the result of calculation within brackets [ ]. The halftone output gradation processing section 28 calculates the difference between the value $V(XP_i)$ on the imaginary curve to the specified density value $XP_i$ and the reference correction value $YB(XP_i)$ to the specified density value $XP_i$ and substitutes the calculated difference to the first correction amount $s_i$ corresponding to the specified density value $XP_i$ as represented by the equation (8) in Step E5. The halftone output gradation processing section 28 ends the process in the flowchart of FIG. 18 after obtaining the first correction amount of the whole specified density values.

$$V(XP_i) = YB\left[XB(V(YM_a)) + \frac{\{XB(V(YM_b)) - XB(V(YM_a))\} \times \{XP_i - XB(YM_a)\}}{XB(YM_b) - XB(YM_a)}\right] \quad (7)$$

$$S_{i-v}(XP_i) - YB(XP_i) \quad (8)$$

The expression within the brackets [ ] on the right side of the equation (7) is an operational expression for converting the input density value within the sixth section $\Delta XB(V(YM_a))$ to the input density value within the fourth section $\Delta XB(YM_a)$. The sixth section $\Delta XB(V(YM_a))$ is a section having the both ends of the input density values $XB(V(YM_a))$ and $XB(V(YM_b))$ on the reference correction curve to the reference correction curves equal to the values of curve $V(YM_a)$ and $V(YM_b)$ to the output target density values at the both ends of the fourth section where the specified density value $XP_i$ exists. Therefore, in the expression within the brackets, the ratio of the width of the sixth section $XB(V(YM_b)) - XB(V(YM_a))$ to the width of the fourth section $XB(YM_b) - XB(YM_a)$ is multiplied with a distance from one smaller end $XP(V(YM_a))$ of the fourth section to the specified density value $XP_i - XB(YM_a)$ and the obtained product is added to the smaller one end $XP(V(YM_a))$ of the fourth section. The reference correction value to the input density value equal to the sum thus obtained is substituted into the value $V(XP_i)$ on the imaginary curve to the specified density value $XP_i$. Because the input density value is an integer, the result of calculation of the expression within the brackets may be round to an integer value and the correction value on the reference correction curve GYB to the input density value equal to the round value may be substituted into the value $V(XP_i)$ on the imaginary curve to the specified density value in calculating the equation (7).

Figure 19:
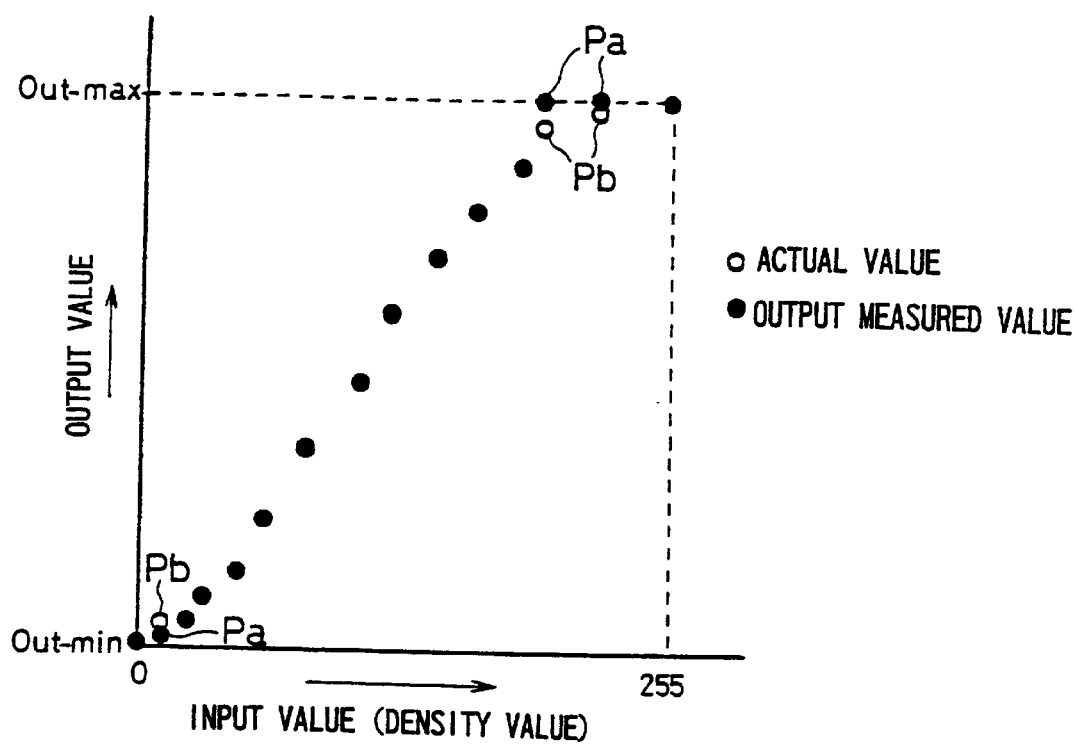
FIG. 19 is a graph for explaining a case of not using the reference correction curve to the specified density value of a pixel whose output measurement value is close to the maximum or minimum value in selecting the output measurement value.

In the process for setting the first correction amount, preferably the halftone output gradation processing section 28 removes the output measurement value from the operation parameters of the process for setting the first correction amount when the output measurement value is close to the upper limit output value Out-max in the range of the output values of the image input unit 13 as shown in FIG. 19. Preferably, the halftone output gradation processing section 28 also removes the output measurement value from the operation parameters of the process for setting the first correction amount when the output measurement value is close to the lower limit output value Out-min in the range of the output values of the image input unit 13 as shown in FIG. 19 due to the following reasons.

In reading a pixel having density close to the upper limit density in the range of density which can be read by the image input unit 13 and in reading a pixel having density close to the lower limit density in the range of the density, the image input unit 13 hardly distinguishes the density of the pixel from the before and after the original density. Therefore, when the output measurement value is close to the upper limit or lower limit output value, there is a possibility that the image input unit 13 has read the density of the patch erroneously. It is preferable to remove the range of the output values corresponding to the range of density which is liable to be erroneously read by the image input unit 13, i.e., the output measurement value within the range near the upper limit output value or within the range near the lower limit output value, from the operational parameters in order to obtain more adequate first correction value. To that end, when there is the output measurement value on the outside of the range of the output values corresponding to the range of density which is liable to be read erroneously by the image input unit 13, the halftone output gradation processing section 28 executes a process for calculating the value on the imaginary curve using the output measurement value and when there is the output measurement value within the range of the output value, stops the process for calculating the value on the imaginary curve using the output measurement value. Thereby, the first correction amount corresponding to the specified density value within the low and high density parts becomes more adequate.

Figure 20:
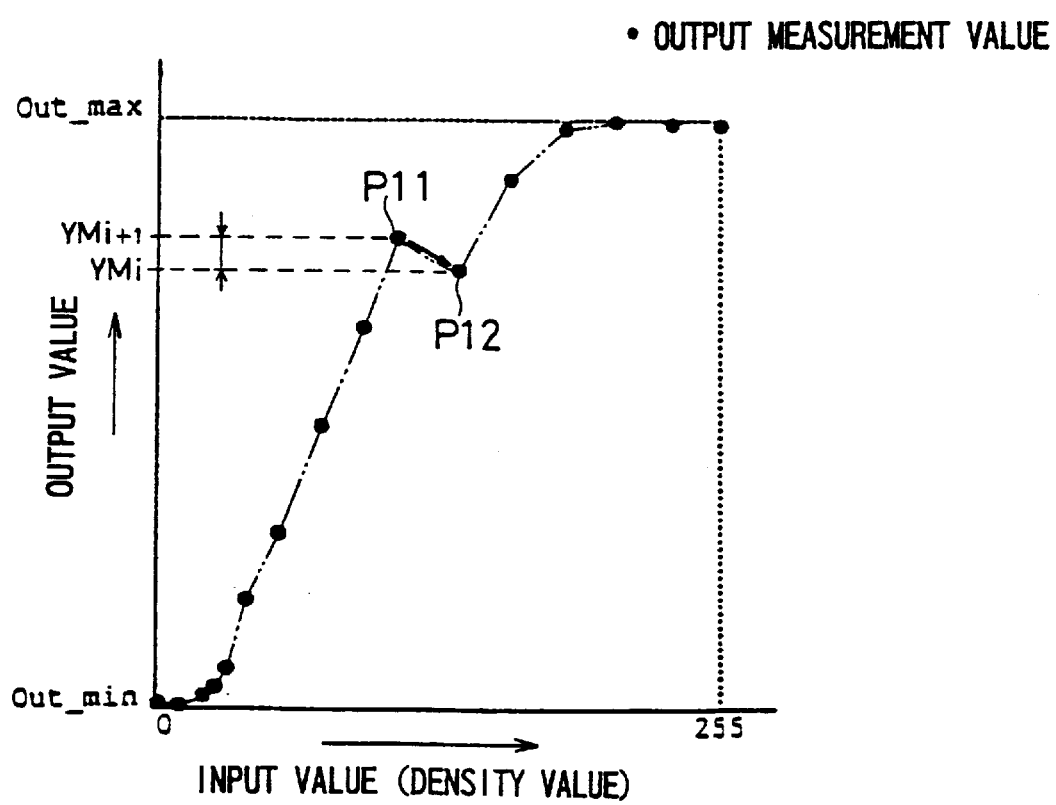
FIG. 20 is a graph for explaining a case in which the output measurement value to the specified density value is not increasing monotonously in selecting the output measurement value.

In the process for setting the first correction amount, preferably the halftone output gradation processing section 28 removes the output measurement value not increasing monotonously from the operational parameters of the process for setting the first correction amount when the output measurement value has the part not increasing monotonously in the change pattern of the output measurement value to the specified density value as shown in FIG. 20. It is because the output measurement value not increasing monotonously is unnatural data due to the unstability of the image output unit 15 and the erroneous reading of the image input unit 13. Whether or not the part from the i-th (in this case, "i" is an integer greater than 1 and less than the total number of the specified density values) specified density value $XP_i$ to the i+1-th specified density value $XP_{i+1}$ is increasing monotonously may be found out by checking whether the gradient of the change pattern is positive or negative.

The halftone output gradation processing section 28 subtracts the output measurement value $YM_i$ of the i-th specified density value from the output measurement value $YM_{i+1}$ of the i+1-th specified density value, calculates the value on the imaginary curve by using the output measurement values $YM_i$ and $YM_{i+1}$ when the sign of the obtained difference $YM_{i+1} - YM_i$ is positive and stops the calculation of the value on the imaginary curve using the output measurement values $YM_i$ and $YM_{i+1}$ when the difference $YM_{i+1} - YM_i$ is negative. Thereby, the halftone output gradation processing section 28 can create a smoother correction curve.

When the difference $YM_{i+1} - YM_i$ of the output measurement values is negative, the halftone output gradation processing section 28 may correlate the average value of those output measurement values $YM_i$ and $YM_{i+1}$ to the specified density values $XP_i$ and $XP_{i+1}$ by replacing with the respective output measurement values instead of removing the output measurement values $YM_i$ and $YM_{i+1}$. Thereby, the halftone output gradation processing section 28 can prevent the parameters used in the interpolation operation from decreasing too much in the interpolation operation in the process for setting the first correction amount. The halftone output gradation processing section 28 may also find an input density value on the target output curve to the average value of the output measurement values $YM_i$ and $YM_{i+1}$ and substitute the reference correction value to the average input density value of the specified density values $XP_i$ and $XP_{i+1}$ corresponding to the output measurement values $YM_i$ and $YM_{i+1}$ to the correction value to the found input density value.

As described above, the above-mentioned gradation correcting process serves also as a dither process. When the gradation correcting process serves also as the dither process, preferably the correction amounts corresponding to the reference correction curve and the specified density value are set per size of the dither matrix.

TABLE 2

| Total of Gradation Value | First Table | Second Table | Third Table | Fourth Table |
|---|---|---|---|---|
| 0 to 255 | 0 to 255 | 0 | 0 | 0 |
| 256 to 510 | 255 | 1 to 255 | 0 | 0 |
| 511 to 765 | 255 | 255 | 1 to 255 | 0 |
| 766 to 1020 | 255 | 255 | 255 | 1 to 255 |

Table 2 shows tables allocated respectively to four pixels within the dither matrix of 2×2. The first table is used in the process for creating a correction table corresponding to the first pixel D1 within the dither matrix. The second table is used in the process for creating a correction table corresponding to the second pixel D2. The third table is used in the process for creating a correction table corresponding to the third pixel D3. The fourth table is used in the process for creating a correction table corresponding to the fourth pixel D4. The vertical axis of the graph of the correction curve is quartered and the four areas which are the result of the division are allocated one after another to the first, second, third and fourth tables in order from the area where the maximum correction value is small. The correction value to the input density value in each table is defined corresponding to a certain part within the allocated area of the correction curve.

Values obtained by allocating the correction value on the correction curve corresponding to the input density value to the first through fourth pixels may be found by using the first through fourth tables. Thereby, the correction table per each pixel can be obtained when the reference correction curve and the correction amount are set per size of the dither matrix, the halftone output gradation processing section 28 can execute the adequate gradation correction corresponding to the size of the dither matrix. While the case of using the dither matrix of 2×2 has been described in the above explanation, the dither matrix is not limited to that and a dither matrix other than 2×2 may be used.

The concrete values of the various parameters used in the explanation of the present embodiment are just illustration and other values may be used. For instance, the number of the reference correction curves needs not be five and may be one at least. The number of the specified density values needs not be 16 and will do if it is a plural number. The upper limit value of the input density value needs not be 255. The lower limit value of the input density value needs not be zero. When the gradation correcting process serves also as part of the dither process, the upper limit value of the reference correction value may be ms times of the upper limit value of the input density value. When the gradation correcting process does not serve as part of the dither process, it will do if the upper limit value of the reference correction value is equal to the upper limit value of the input density value.

In the present embodiment, the image processor 14 includes a processing section besides the halftone output gradation processing section 28. The image processor 14 will do if it contains at least the halftone output gradation processing section 28, the curve storing section 31 and the correction value storing section 32 and other processing part may be omitted as necessary. While the gradation correcting process of the present embodiment also serves as the halftone correcting process, the gradation correcting process and the halftone correcting process of the present embodiment may be executed separately. The gradation correcting process of the present embodiment may be applied also in executing the input gradation correcting process.

The process executed by the halftone output gradation processing section 28 of the present embodiment may be executed by a computer. To that end, a control program for executing the process of the halftone output gradation processing section 28 by a central operation processing circuit and data stored in a curve storing section 21 and a correction amount storing section 22 are stored in a computer readable storage medium. The control program and data compose a control software for the gradation correcting process. When the control software within the storage medium is installed in the computer and the central operation processing circuit of the computer executes the control program, the computer can execute the same process as the halftone output gradation processing section 28.

Figure 21:
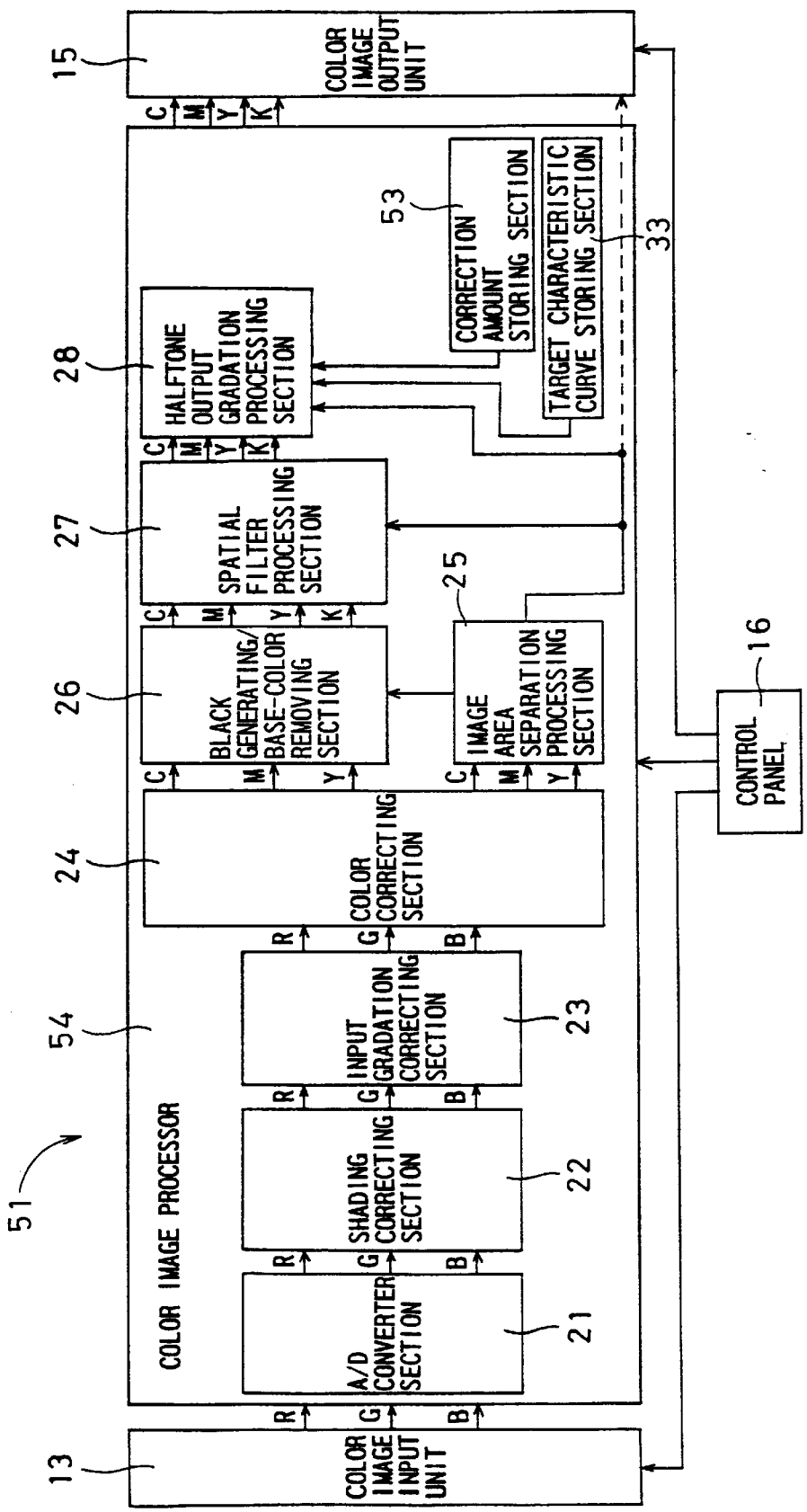
FIG. 21 is a block diagram showing the structure of the image processor when the correction curve is stored in advance.

The image processor described above calculates the correction curve used in the gradation correcting process as necessary based on the reference correction curve and the correction amount. The correction curve may be created in advance by using the analogous interpolation and be always stored in the image processor. FIG. 21 is a block diagram showing the structure of an image forming apparatus 51 when it is provided with the image processor for which the correction curve has been created in advance. Among all components of the image forming apparatus 51 in FIG. 21, only the components different from the image forming apparatus 11 in FIG. 2 will be explained and the same reference numerals are denoted to the same components as those in the image forming apparatus 11 in FIG. 2 and an explanation thereof will be omitted here.

The image processor 54 has a correction curve storing section (cc storing means) 53 for storing the very correction curve used in the gradation correcting process instead of the curve storing section 31 and the correction amount storing section 32. Other than that, its structure is the same as the image processor 14 in FIG. 2. The halftone output gradation processing section 28 reads the correction curve from the correction curve storing section 53 in executing the gradation correcting process and creates a γ correction table by using the read correction curve. Thereby, the image forming apparatus 51 in FIG. 21 can execute the gradation correcting process more quickly than the image forming apparatus 11 in FIG. 2 in outputting images by the time for creating the correction curve.

The correction value on the correction curve stored in the correction curve storing section 53 is calculated by the same procedure as that for calculating the value on the imaginary curve in setting the first correction amount explained in connection with FIG. 18 by using the analogous interpolation. The procedure for creating the correction curve will be explained below. The reference correction curve and the target characteristic curve are prepared in advance to create the correction curve.

At first, the gradation correcting process using the reference correction curve is performed to the image pattern of each specified density value $XP_i$ and the image pattern of each specified density value $XP_i$ on which the gradation correcting process has been performed is outputted from the image output unit 15. Next, the density of the image pattern of the outputted specified density value $XP_i$ is read to obtain the output measurement value $YM_i$ corresponding to each specified density value. Then, the input density value $XB(YM_i)$ on the target characteristic curve to the output density value $YM_i$ corresponding to each specified density value is calculated and the reference correction value YB(XP$_i$) to the specified density value XP$_i$ is substituted into the correction value YP(YM$_i$) to the calculated output target density value XB(YM$_i$).

Finally, the correction value to the input density value other than the output target density value XB(YM$_i$) is calculated by the interpolation operation using the analogous interpolation. At this time, the interpolation operation is carried out so that the shape of one part of the correction curve within the fourth section $\Delta$XB(YM$_a$) having the both ends of the output target density values XB(YM$_a$) and XB(YM$_b$) sandwiching the specified density value XP$_i$ coincides with the shape of one part of the reference correction curve extended or compressed in the direction X of the axis of density value within the fifth section having the both ends of the correction values YP(XB(YM$_a$)) and YP(XB(YM$_b$)) to the output target density values XB(YM$_a$) and XB(YM$_b$) at the both ends of the fourth section.

The correction curve created by using the analogous interpolation as described above is smoother than the correction curve created by using the spline interpolation or n-order function approximation for the interpolation operation even though it is created by the simple calculations. Further, the output characteristic of the correction curve per fourth section having the both ends of the specified density values is analogous to the output characteristic of the reference correction curve of the fifth section having the both ends of the correction values on the reference correction curve for the specified density values which are the same as the both ends of the first section.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image processor comprising:

image inputting means for inputting an image;

gradation correction processing means for performing a gradation correcting process using a correction curve to the inputted image; and image outputting means for outputting the image for which the gradation correcting process has been performed, the image inputting means supplying input density values of pixels composing the image, to the gradation correction processing means, the gradation correction processing means supplying correction values on the correction curve to the input density values, to the image outputting means, the image processor further comprising:

reference correction curve storing means for storing a reference correction curve indicative of predetermined changes of the correction values to the input density values; and correction amount storing means for storing correction amounts w$_i$ and w$_{i+1}$ which are preset based on the reference correction curve and correspond to a plurality of specified density values XP$_i$ and XP$_{i+1}$, respectively, which are input density values specified at intervals from each other within the range of the input density values, wherein the correction amount w$_i$ corresponding to the specified density value XP$_i$ is a difference between a correction value YB(XP$_i$) on the reference correction curve to the specified density value XP$_i$ and a correction value YP(XP$_i$) to the specified density value on the correction curve, the gradation correction processing means, in order to create the correction curve to be used for the gradation correcting process, (a) calculates the correction values YP(XP$_i$) and YP(XP$_{i+1}$) to the specified density values XP$_i$ and XP$_{i+1}$ on the correction curve, by adding the correction values to the specified density values XP$_i$ and XP$_{i+1}$ on the reference correction curve and the correction amounts w$_i$ and w$_{i+1}$ corresponding to the specified density values XP$_i$ and XP$_{i+1}$, and (b) calculates the correction value to the input density value other than the specified density value by means of interpolation operation for causing a shape of a part of the correction curve within a first section $\Delta$XP$_i$ having the specified density values XP$_i$ and XP$_{i+1}$ as both ends thereof, to coincide with a shape obtained by expanding or compressing in the direction X parallel to the axis of density value, a part of the reference correction curve within a second section $\Delta$YB$_i$ having the correction values YP(XP$_i$) and YP(XP$_{i+1}$) to the specified density values as both ends thereof.

2. The image processor of claim 1, wherein during the interpolation operation, the gradation correction processing means:

(a) calculates a third section $\Delta$XB$_i$ which is a section having input density values XB(YB$_i$) and XB(YB$_{i+1}$) on the reference correction curve to the correction values YP(XP$_i$) and YP(XP$_{i+1}$) to the specified density values, as both ends thereof;

(b) correlates the input density value J$_i$ within the third section with the input density value XX(J$_i$) within the first section so that the both ends of the third section $\Delta$XB$_i$ coincide with the both ends of the first section $\Delta$XP$_i$; and (c) uses the correction value YB(J$_i$) to the input density value J$_i$ within the third section on the reference correction curve as the correction value YP(XX(J$_i$)) on the correction curve to the input density value XX(J$_i$) within the first section correlated with the input density value J$_i$.

3. The image processor of claim 2, wherein in determining input value density XX(J$_i$) within the first section correlated with the input density value J$_i$ within the third section, the gradation correction processing means:

(a) calculates a value obtained by adding a specified density value XP$_i$ at one end of the first section to a product of a ratio of a width XP$_{i+1}$-XP$_i$ of the first section to a width XB(YB$_{i+1}$)-XB(YB$_i$) of the third section and a distance J$_i$-XB(YB$_i$) from one end of the third section to the input density value within the third section; and (b) rounds the calculated sum to a predetermined number of digits and correlates the input density value XX(J$_i$) within the first section which is equal to the rounded value, to the input density value J$_i$ within the third section.

4. The image processor of claim 2, wherein in carrying out the interpolation operation in which the shape of the correction curve at one part within the first section $\Delta$XP$_i$ assumes a shape in which a part of the reference correction curve within the second section $\Delta YB_i$ is extended in the direction X parallel to the axis of density value, the gradation correction processing means finds a correction value on the correction curve to the remaining input density value other than the input density value $XX(J_i)$ correlated with the input density value $J_i$ within the third section among all input density values within the first section, by means of interpolation operation.

5. The image processor of claim 3, wherein in carrying out the interpolation operation in which the shape of the correction curve of a part within the first section $\Delta XP_i$ assumes a shape in which a part of the reference correction curve within the second section $\Delta YB_i$ is compressed in the direction X parallel to the axis of density value, when a plurality of input density values within the third section are correlated to the single input density value $XX(J_i)$ within the first section, the gradation correction processing means uses a correction value to an input density value calculated at last among the plurality of input density values within the third section on the reference correction curve, as the correction value $YP(XX(J_i))$ on the correction curve to the input density value $XX(J_i)$ within the first section.

6. The image processor of claim 3, wherein in carrying out the interpolation operation in which the shape of the correction curve of a part within the first section $\Delta XP_i$ assumes a shape in which a part of the reference correction curve within the second section $\Delta YB_i$ is compressed in the direction X parallel to the axis of density value, when a plurality of input density values within the third section are correlated to the single input density value $XX(J_i)$ within the first section, the gradation correction processing means uses a center value of the correction values on the reference correction curve to plurality of input density values within the third section, as the correction value $YP(XX(J_i))$ on the correction value to the input density value $XX(J_i)$ within the first section.

7. The image processor of claim 1, wherein one density value among the plurality of specified density values is a lower limit density value within the range of the input density values.

8. The image processor of claim 1, wherein one density value among the plurality of specified density values is an upper limit density value within the range of the input density values.

9. The image processor of claim 1, wherein in creating the correction curve, the gradation correction processing means always uses a value defined in advance per each input density value as a correction value on the correction value to each input density value located at least in one of the section from the upper limit density value within the range of the input density values to the first input density value set in advance and the section from the lower limit density value within the range of the input density values to the second input density value set in advance.

10. The image processor of claim 1, wherein the gradation correction processing means selects any one reference correction curve among a plurality of reference correction curves corresponding to the output characteristics intrinsic to the image outputting means and uses the selected reference correction curve in creating the correction curve when the reference correction curve storing means stores the plurality of reference correction curves.

11. The image processor of claim 1, wherein the gradation correction processing means:

(a) causes the image outputting means to output the image pattern of the plurality of specified density values without performing the gradation correcting process;

(b) causes the image inputting means to read the density values of the outputted image pattern;

(c) compares the read density values with the reference characteristic curve set in advance and correlated with each of the reference correction curves; and (d) selects the reference correction curve correlated to the reference characteristic curve closest to the read density values.

12. The image processor of claim 1, wherein the correction amount corresponding to the specified density value is a first correction amount which is a correction amount based on the output characteristics intrinsic to the image outputting means.

13. The image processor of claim 1, further comprising:
adjustment amount input means for inputting an adjustment amount set in connection with the gradation correcting process of the image,
wherein the correction amount to the specified density value is a second correction amount which is a correction amount based on the inputted adjustment amount.

14. The image processor of claim 1, further comprising:
adjustment amount inputting means for inputting an adjustment amount set in connection with the gradation correcting process of the image,
wherein the correction amount corresponding to the specified density value is a sum of the first correction amount which is the correction amount based on the output characteristics intrinsic to the image outputting means and the second correction amount which is the correction amount based on the inputted adjustment amount.

15. The image processor of claim 13, wherein the second correction amount is a total sum of correction amounts defined per each adjustment amount when a plurality of adjustment amounts are inputted from the adjustment amount inputting means.

16. The image processor of claim 12, further comprising:
target characteristic curve storing means for storing a target characteristic curve indicative of predetermined changes of the density of the pixel of the image outputted by the image outputting means to the input density value;
wherein the gradation correction processing means:
(a) performs the gradation correcting process using the reference correction curve to the image pattern of each of specified density values $XP_i$;
(b) causes the image outputting means to output the image pattern of each specified density value $XP_i$ whose gradation has been corrected;
(c) causes the image inputting means to read the density $YM_i$ of the image pattern of each outputted specified density value; and
(d) compares the read density $YM_i$ with the target characteristic curve and decides the first correction amount based on the comparison result in determining the first correction amount.

17. The image processor of claim 16, wherein in comparing the density $YM_i$ of the image pattern of each specified density value read as described above with the target characteristic curve, the gradation correction processing means:
(a) calculates the input density value $XB(YM_i)$ on the target characteristic curve to the density $YM_i$ of the image pattern of each specified density value;
(b) uses the correction value $YB(XP_i)$ on the reference correction curve to the specified density value $XP_i$, as a value $V(YM_i)$ on an imaginary curve to the calculated input density value $XB(YM_i)$;

(c) calculates a value $V(XP_i)$ on the imaginary curve to each specified density value $XP_i$ by means of interpolation operation of causing a shape of the imaginary curve within a fourth section $\Delta XB(YM_i)$ having as both ends thereof, input density values $XB(YM_a)$ and $XB(YM_b)$ which are located at both ends of the specified density value $XP_i$ and to which values on an imaginary curve have been calculated, to coincide with a shape obtained by expanding or compressing a fifth section $\Delta V(YM_a)$ having as both ends thereof, the values $V(YM_a)$ and $V(YM_b)$ on the imaginary curve to the input density values of the both ends of the fourth section, in the direction X parallel to the axis of density value; and (d) uses the difference between the value $V(XP_i)$ on the imaginary curve to the calculated specified density value and the correction value $YB(XP_i)$ on the reference correction curve to the specified density value, as a first correction amount $s_i$ corresponding to the specified density value $XP_i$.

18. The image processor of claim 16, wherein when the read density of the image pattern of the specified density value is out of the preset range of the density where the image inputting means is liable to erroneously read, the gradation correction processing means carries out calculation of values on the imaginary curve using the density and when the read density of the image pattern of the specified density value is within the range of the density, the gradation correction processing means stops the calculation of values on the imaginary curve using the density.

19. The image processor of claim 17, wherein the gradation correction processing means:

calculates the correction value on the correction curve by using densities $YM_i$ and $YM_{i+1}$ when the difference obtained by subtracting read density $YM_i$ of the image pattern of the specified density value $XP_i$ from read density $YM_{i+1}$ of the image pattern of the other specified density value $XP_{i+1}$ which is greater than the specified density value $XP_i$ is a positive value, and stops the calculation of values on the imaginary curve using the densities $YM_i$ and $YM_{i+1}$ when the difference is a negative value.

20. The image processor of claim 17, wherein the gradation correction means:

calculates the correction value on the correction curve by using densities $YM_i$ and $YM_{i+1}$ when the difference obtained by subtracting read density $YM_i$ of the image pattern of the specified density value $XP_i$ from read density $YM_{i+1}$ of the image pattern of the other specified density value $XP_{i+1}$ which is greater than the specified density value $XP_i$ is a positive value, and when the difference is negative, calculates an average density of the density $YM_i$ of the specified density value and the density $YM_{i+1}$ of the other specified density value, calculates an input density value on the target characteristic curve to the average density and uses the correction value on the reference correction curve, corresponding to the average input density value of the specified density value $XP_i$ and the other specified density value $XP_{i+1}$ as a value on the imaginary curve to the calculated input density value.

21. The image processor of claim 1, wherein when the image is a color image, the reference correction curve and the correction amount corresponding to the specified density value are set per each of a plurality of color components.

22. The image processor of claim 1, further comprising:

halftone generating processing means for performing a dither type halftone generating process to the image, wherein the reference correction curve and the correction amount corresponding to the specified density value are set per size of a dither matrix which can be used by the halftone generating processing means.

23. An image processor comprising:

image inputting means for inputting an image, gradation correction processing means for performing a gradation correcting process using a correction curve to the inputted image; and image outputting means for outputting the image for which the gradation correcting process has been performed, the image inputting means supplying input density values of pixels composing the image, to the gradation correction processing means, the gradation correction processing means supplying correction values to the input density values on the correction curve, to the image outputting means, the image processor further comprising:

curve storing means for storing the correction curve, wherein the correction curve indicates a change of the correction value to the input density value, and is prepared, based on the reference correction curve indicative of a preset change of the correction value to the input density value and a target characteristic curve indicative of a preset change to the input density value of the density of the pixel outputted by the image outputting means, in such a manner that:

(a) an image pattern of each of a plurality of specified density values $XP_i$ and $XP_{i+1}$ which are the input density values specified at intervals from each other within the range of the input density values is subjected to the gradation correcting process using the reference correction curve;

(b) an image pattern of each of the specified density values $XP_i$ and $XP_{i+1}$ whose gradation has been corrected is outputted by the image outputting means;

(c) densities $YM_i$ and $YM_{i+1}$ of the outputted image pattern of each of the specified density values $XP_i$ and $XP_{i+1}$ is read;

(d) input density values $XB(YM_i)$ and $XB(YM_{i+1})$ on the target characteristic curve to the densities $YM_i$ and $YM_{i+1}$ of the image pattern of the respective specified density values are calculated;

(e) correction values $YB(XP_i)$ and $YB(XP_{i+1})$ on the reference correction curve to the specified density values $XP_i$ and $XP_{i+1}$ are adopted as correction values $YP(YM_i)$ and $YP(YM_{i+1})$ on the correction curve to the calculated input density values $XB(YM_i)$ and $XB(YM_{i+1})$; and (f) a correction value on the correction curve to the input density value within a section $\Delta XB(YM_i)$ having the calculated input density values $XB(YM_i)$ and $XB(YM_{i+1})$ as both ends thereof is calculated by an interpolation operation for causing a shape of a part of the correction curve within the section $\Delta XB(YM_i)$ to coincide with a shape obtained by extending or compressing a part of the reference correction curve within a section $\Delta V(YM_i)$ having as both ends thereof, values $V(YM_i)$ and $V(YM_{i+1})$ on an imaginary curve to the calculated input density values $XB(YM_i)$ and $XB(YM_{i+1})$, in the direction X of the axis of density value.

* * * * *